(12) United States Patent
Laydera-Collins

(10) Patent No.: US 11,632,903 B1
(45) Date of Patent: Apr. 25, 2023

(54) EXTERNALLY WINDABLE TRIMMER HEAD

(71) Applicant: Imack Laydera-Collins, Benton, LA (US)

(72) Inventor: Imack Laydera-Collins, Benton, LA (US)

( * ) Notice: Subject to any disclaimer, the term of this patent is extended or adjusted under 35 U.S.C. 154(b) by 0 days.

(21) Appl. No.: 17/981,751

(22) Filed: Nov. 7, 2022

Related U.S. Application Data

(60) Provisional application No. 63/414,597, filed on Oct. 10, 2022.

(51) Int. Cl.
*A01D 34/416* (2006.01)

(52) U.S. Cl.
CPC ..... *A01D 34/4166* (2013.01); *A01D 34/4163* (2013.01)

(58) Field of Classification Search
None
See application file for complete search history.

(56) References Cited

U.S. PATENT DOCUMENTS

| | | | |
|---|---|---|---|
| 2,429,675 A | 10/1947 | Eypper | |
| 3,708,967 A | 1/1973 | Geist | |
| 3,826,068 A | 7/1974 | Ballas | |
| 4,054,992 A | 10/1977 | Ballas | |
| 4,097,991 A | 7/1978 | Proulx | |
| 4,145,809 A | 3/1979 | Proulx | |
| 4,172,322 A | 10/1979 | Ballas | |
| 4,412,382 A * | 11/1983 | White, III | A01D 34/4163 30/276 |
| 4,685,279 A | 8/1987 | Gullett | |
| 4,756,146 A | 7/1988 | Rouse | |
| 4,823,465 A | 4/1989 | Collins | |
| 4,835,867 A | 6/1989 | Collins | |
| 5,657,542 A | 8/1997 | White et al. | |
| 5,659,960 A | 8/1997 | Everts et al. | |
| 5,758,424 A | 6/1998 | Iacona | |
| 5,765,287 A | 6/1998 | Griffini | |
| 5,806,192 A | 9/1998 | Everts et al. | |
| 6,148,523 A | 11/2000 | Everts et al. | |
| 6,854,185 B1 | 2/2005 | Alliss | |

(Continued)

*Primary Examiner* — Hwei-Siu C Payer

(57) ABSTRACT

The cutting head assembly object of the present invention comprises a trimmer line feed mechanism and a trimmer line winding mechanism. A lower cover member coupled to the housing member and has a central opening to hold a ground engaging button member. The ground engaging button member is rotationally engaged to the spool. The upper section of the ground engaging button member and the internal walls of the cover ring have radially and axially extending structures which cooperate with each other to provide a ratcheting and indexing mechanisms that allows controlled rotation of the spool which is constrained from axial movement relative to the housing member by biasing the force of a compression spring which also maintains the ground engaging member in an extended position. The winding mechanism allows to manually turn the knob in one direction while the indexing mechanism allows to control rotational increments of the knob to allow the spool to release controlled increments of line when the ground engaging member is bumped against the ground and to stop rotation of the spool during normal running position.

20 Claims, 18 Drawing Sheets

(56) References Cited

U.S. PATENT DOCUMENTS

| | | |
|---|---|---|
| 6,952,877 B2 | 10/2005 | Pfaltzgraff |
| 7,412,768 B2 | 8/2008 | Alliss |
| 7,513,046 B2 | 4/2009 | Proulx |
| 11,470,772 B2 * | 10/2022 | Zenkus ............... A01D 34/4166 |
| 2018/0020614 A1 * | 1/2018 | Alliss ................. A01D 34/4163 |
| | | 30/276 |
| 2018/0098492 A1 * | 4/2018 | Guo ................... A01D 34/4166 |
| 2019/0185289 A1 * | 6/2019 | Alliss ................. A01D 34/4166 |

* cited by examiner

EXTERNALLY WINDABLE TRIMMER HEAD

CROSS REFERENCE TO RELATED APPLICATIONS

This application claims the benefit of the U.S. Provisional Application 63/414,597 filed on Oct. 10, 2022. Copy of the referenced Provisional Patent Application is incorporated herein.

BACKGROUND OF THE INVENTION

1.—Field of the Invention

In general, the present invention relates to string trimmers and the rotating heads of string trimmers. More particularly, the present invention relates to the mechanisms contained within string trimmer heads for winding, holding and dispensing new lengths of trimmer line when needed.

2.—Prior Art Description

String trimmer machines have been commercially sold for almost 50 years. In this period of time, there have been many variations to the design of the trimmer head.

Since the invention of the flexible filament trimmer by G. Ballas in the early 70's the trimmer head have gone through many cycles of improvements. These improvements has been made having as a driver the convenience for use and operate. Most of these improvements were focused on the easy of line dispensing and replacing the filament line onto the head. As an example following Ballas invention, which wasn't too user friendly at the time, manufacturer's implemented the Tap-n-go system which added convenience of operation, exemplary patents are U.S. Pat. No. 4,047,299 by Bair, U.S. Pat. No. 4,663,588 by Pittinger. The Tap-n-go system consists in a head having an internal mechanism that allows to lock the spool containing the trimmer line during operation, and by tapping the head against the ground the internal mechanism allows a partial rotation of the spool to dispense trimmer line as the line wears out. The Tap-n-go system has been very successful and currently it is still in use on many trimming heads in the market. The primary problem associated with such traditional trimmer heads is trimmer line reloading, in order to replenish and reload new trimmer line into the trimmer head, the trimmer head must typically be disassembled and the internal spool removed. Replacement trimmer line is manually wound onto the spool, then threading the line end through the eyelets and closing the assembly. This process is often too difficult for many homeowners to complete successfully or even attempt. As manufacturer's sought a competitive advantage to increase their market share, improvements kept on evolving and the ease of line replacement issue was yet a problem to be resolved. Among these improvements manufacturer's devised systems as pre-wound spools, easy accessible reducing internal parts, longer lasting filament line and fixed flails. These improvements weren't yet too appealing to users. The second greatest milestone in the evolution of the Tap-n-go head came when an Italian inventor named Alberto Griffini was awarded the U.S. Pat. No. 5,765,287 which presented the idea of winding replacement line onto the spool without opening the head assembly. His invention utilized the same early technology of the Tap-n-go head and by modifying the shape of the internal indexing mechanism into the combination of a ratcheting system to manually wind the replacement line onto the spool and the traditional indexing system. His invention not totally perfect and cost effective, allowed to turn the spool from outside the head to wind line onto the spool. Shortly after Grifinni's patent publication, many inventors were primed by his concepts and following his lead a new collection of externally windable heads appeared in the market. Examples are the U.S. Pat. No. 6,952,877 by Pfaltzgraff and U.S. Pat. No. 6,854,185 by Alliss.

All these inventions following Griffin's idea have found a common problem which is the routing of the trimmer line through the spool core. Many have added extra parts to accommodate the necessary passages to guide the line through the spool core and others have implemented alternate routings to overcome such issues and to avoid infringement of existing in-force patents. The common denominator on all current trimmer heads with the feed trough system is the use of the Tap-n-go system to dispense line and therefore the spool is generally moving axially relative to the head. Due to this commonality, the elements that control the spool rotation have to be re-arranged or modified to allow the trimmer line to cross the spool core. This chore becomes even more difficult when the bolt attaching the head to the trimmer machine is very long and crosses through the center of the spool making the trimmer line channels curving around the center of the spool.

As the skilled in the art may recognize, the mechanism for releasing the trimmer line is usually the first part of a string trimmer machine that fails to work do to jamming or line binding inside the spool. A need therefore exists for a string trimmer head that has an inexpensive yet reliable mechanism for dispensing trimmer line when needed. Furthermore, a need exists for a trimmer head that does not have to be disassembled to have new string added. Lastly, a need exists for a trimmer head that can be manufactured inexpensively with few operating parts and can operate on many of the trimmer machines in the market, either as a uni-directional or bi-directional trimmer head. These needs are met by the present invention as described and claimed below.

SUMMARY OF THE INVENTION

The present invention is for a externally windable trimmer head assembly and the method of configuring the trimmer head assembly. The trimmer head assembly attaches to a string trimmer machine. The trimmer head assembly holds lengths of flexible filament line that cuts vegetation when the trimmer head assembly spins and contacts the vegetation. The trimmer head assembly has a housing that attaches to the string trimmer machine. A spool is provided inside the housing. The spool rotates about a common axis of rotation. The spool does not move axially along the axis of rotation. A ratcheting mechanism and an indexing mechanism are provided between the trimmer head lower cover and the bumping knob. When the bumping knob is in its normal extended position, during operation, the spool is locked. When line feeding is needed, very similar to many tap-n-go models, the head is bumped against the ground while rotating at high speed, this allows the bumping knob to move into a retracted position, which disengages the rotation control elements for locking the spool and engages the indexing system which allows a partial rotation of the spool for feeding a predetermined amount of trimmer line. Once the bumping knob is released from ground contact, the ground bumping knob returns to the extended position to engage the rotation control elements for locking the spool rotation. During this motion, the spool is allow to rotate another angular increment and an additional segment of trimmer line is released. In its lower position the rotation control elements becomes a ratcheting mechanism which enables the spool to discretely rotate about the axis of rotation in the direction opposite in which the spool is allow to rotate inside the trimmer head assembly to dispense line. Using the ratcheting mechanism, new trimmer line can be wound onto the spool, simply by passing the line through the trimmer head and winding the spool manually. No disassembly is required. Preferably the string line can be fed straight through from one eyelet to the other eyelet prior to winding the line onto the trimmer core.

As the skilled in the art will recognize and learn from the aforementioned description is that the Externally Windable Head object of the present invention, provides the function of many externally windable trimmer heads from the prior art, but in essence, the components to provide the function are simplified and in less numbers than many of such competitive forms of prior art. In a nutshell, the basic distinction that sets this invention apart from the prior art is the form in which the spool is maintained axially fixed into the housing with no indexing features and axially pivotal against a portion of the housing assembly to improve the trimmer line routing through the spool, and the relocation of the winding and indexing elements to other than the spool and the housing for a better control and simplified manufacturing. It is therefore an object of the invention to provide improved elements and arrangements thereof in an apparatus for the purposes described which is inexpensive, dependable and fully effective in accomplishing its intended purposes.

Since the operation of dispensing line by the spool is independent of the trimmer head rotation, the trimmer head of the present invention could be used on line trimmer apparatuses with clockwise rotation shaft or counter clock rotation shaft. In a bump-activated trimmer head, the centrifugal force over the flexible filament line overcomes the frictional forces on the spool to allow it to rotate in predetermined steps in the direction to release an amount of flexible filament line. These and other objects of the present invention will be readily apparent upon s review of the following detailed description of the invention and the accompanying drawings.

DETAILED DESCRIPTION OF THE INVENTION

Figure 1A:
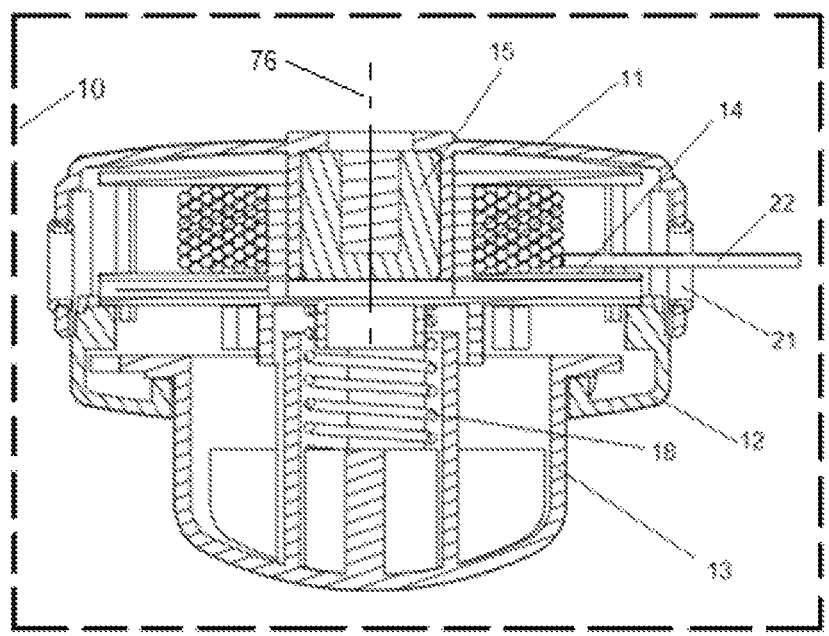
FIG. 1a is a cross-sectional view of a trimmer head according to a first embodiment of the invention displaying the basic elements of the trimmer head.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another" as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language). The term "coupled," as used herein, is defined as connected, although not necessarily directly, and not necessarily mechanically. The term "angularly spaced" means that the referred elements are equidistant over a circumference and have equal angular separation. The term "radially equidistant" means that the referred element are included within a similar circle of equal diameter. The term "windable" means able to be wound. The term "alignable" means able to be aligned or centered in relation to a second object. The term "circumferentially equidistant" means that the referred members share the same circumference. The term "axis of rotation" means an imaginary axis in which the referred element rotates around concentrically. The term "rotatavely" means able to rotate around a rotation axis. The term "slidable" means that the object in reference is able to freely move around a second object. The term "sectional axis" means the imaginary axis crossing through infinite axis of rotations of sections of a body having a non rectilinear axis. Example the axis of a curved hose. The term slope is defined as the angular dimension of an inclined plane relative to a horizontal plane relational terms such as first and second, top and bottom, right and left, inner or outer and the like may be used solely to distinguish one entity or action from another entity or action. Without necessarily requiring or implying any actual such relationship or order between such entities or actions. When using "bottom" or "top" to describe elements features, the orientation of such elements is such that when described it is assumed to be in the normal position for operation. Particularly in the head assembly of the present invention, the head assembly is oriented with a vertical axis of rotation and having the coupling elements at the very top of the assembly. The word "cylindrical" means a body or part of a body or element having two end faces perpendicular to an axis of rotation and a cylindrical surface concentric to the axis of rotation. Example of a "cylindrical" body is a disc, where the distance of the end faces may be near zero.

Figure 1B:
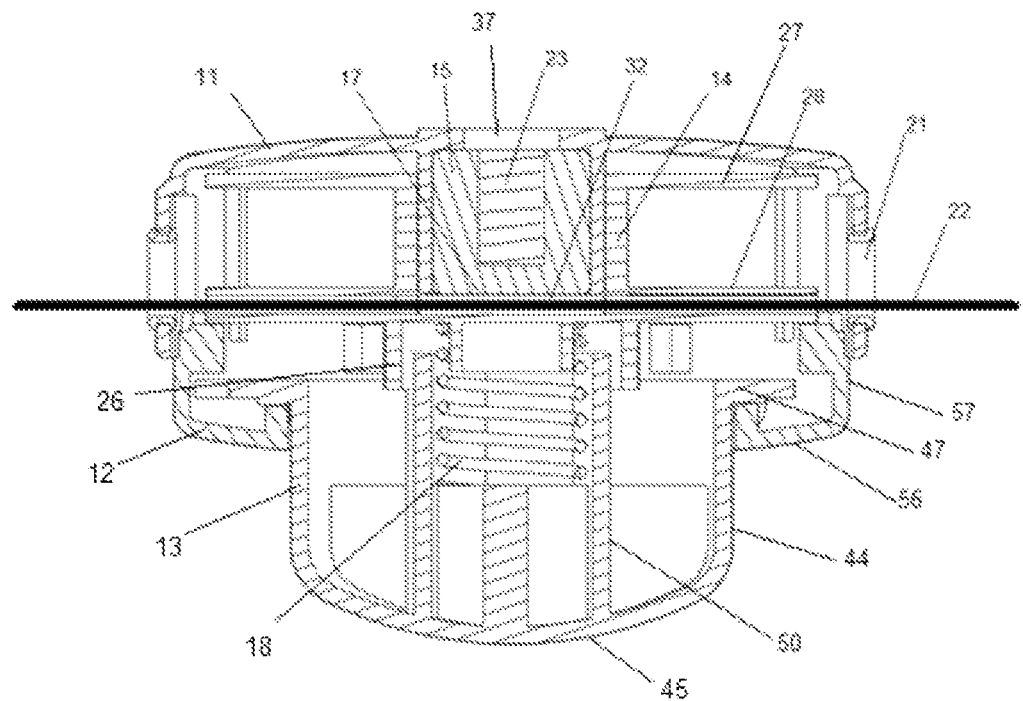
FIG. 1b is a cross sectional view of a trimmer head according to a first embodiment of the invention showing a section of trimmer line threaded through the assembly.
Figure 2:
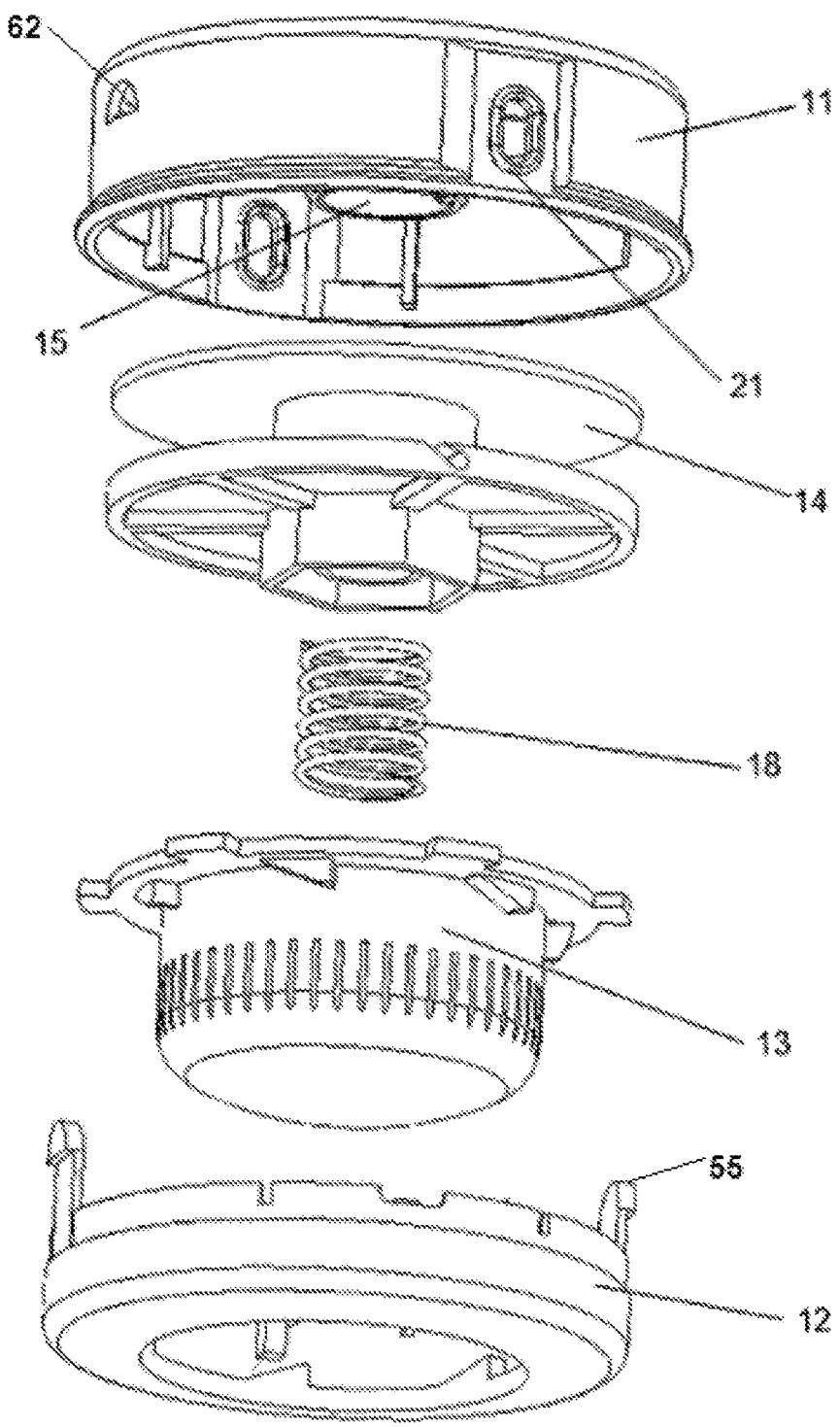
FIG. 2 is an exploded view showing the components of the trimmer head object of the present invention.

Described now are exemplary embodiments of the present invention. With reference to FIG. 1a, FIG. 1 and FIG. 2, an exemplary embodiment of an externally windable trimmer head exemplifying the principles of the invention is depicted. FIGS. 1a and 1b shows sectional views of a first embodiment of a trimmer head 10 for use with a string trimer machine (not shown). FIG. 2 depicts an isometric exploded view of the components of the trimmer head 10. The trimmer head 10 affixes to a string trimmer machine drive shaft arbor (not shown) by a keyed threaded coupler 15 through a housing center hole 61. The keyed threaded coupler is interchangeable to adapt to the configuration of the drive shaft arbor (not shown) of the trimmer machine since different manufacturers of these machines provide different shaft arbor sizes and thread modulus. Typically, the direction of threading of the keyed threaded coupler 15 is selected so that during normal rotation of the drive shaft, the keyed threaded coupler 15 will tend to tighten rather than loosen from the drive shaft arbor. The keyed threaded coupler 15 in cooperation with a housing 11, allows the trimmer head 10 to rotate as a unit with the drive shaft to drive a trimmer line 22 in a radius outwardly from the trimmer head 10. All the elements contained within the trimmer head 10 rotate around an axis of rotation 76. For descriptive purposed the trimmer head axis of rotation 76 is common for all components rotationally disposed within the trimmer head 10. The flexible trimmer line 22 is well known in the art as a flexible filament made of plastic or other flexible material available in a number of filament diameters and is rotated at a high speed to cut grass, weeds or brush that the trimmer line 22 comes in contact with.

Depicted by FIGS. 2, 4a, 4b and 4c is a spool 14 for storage of flexible trimmer line 22. The trimmer line 22, which extends outside the housing 11, rotates at high speed for cutting vegetation. The spool 14 is rotationally disposed within the housing assembly 20 and is axially coupled to a knob 13 which is secured within the housing 11 for a lower cover 12. The lower cover 12 is locked to the housing assembly 20 rotationally and axially for holding the trimmer head 10 components in place. A spring 18 maintains the knob 13 engaged to the lower cover 12 in an extended position. The knob 13 is rotationally and axially movable within the lower cover 12.

Figure 3A:
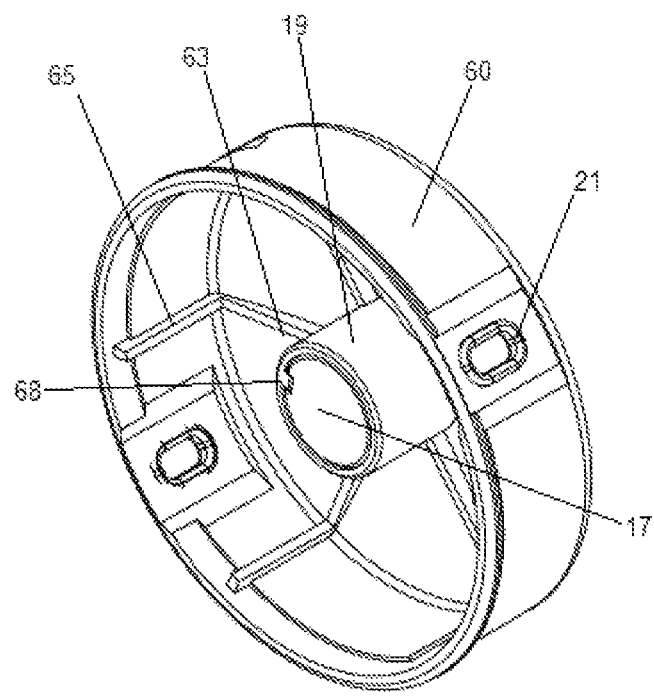
FIG. 3a is an isometric view showing the housing assembly and its components.
Figure 3B:
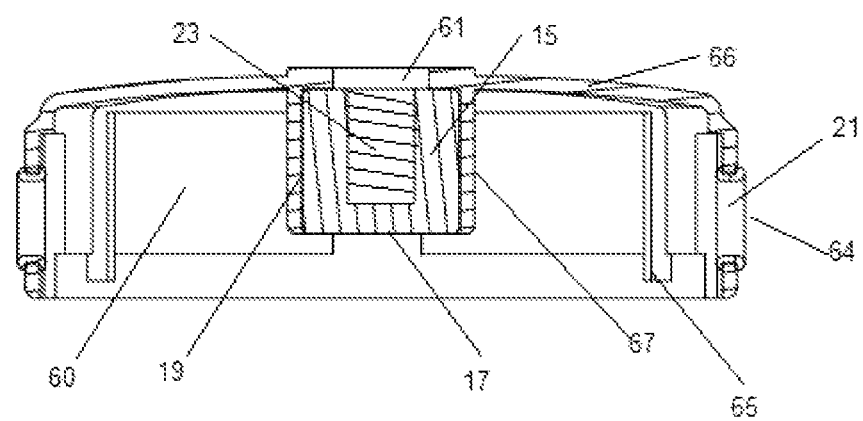
FIG. 3b is a cross sectional view showing the housing and its components.

Referring to FIGS. 3a and 3b showing a housing assembly 20 which includes the housing 11, the keyed threaded coupler 15 and the eyelets 21. The housing 11 includes a housing central annular pocket 19 that receives the keyed threaded coupler 15 to prevent the keyed threaded coupler 15 from rotating relative to the housing 11 by means of a key 68 projecting radially inwards from the inner wall of the central annular pocket 19, which is shown as being cylindrical with a key 68, but different shapes may be chosen to accommodate a variety of keyed threaded couplers 15 to secure the housing 11 to the trimmer machine arbor (not shown) through the housing center hole 61 in a way that the chosen keyed threaded coupler 15 does not turn relative to the housing 11. The housing 11 has a peripheral wall portion 60 circumscribing the geometrical axis of rotation 76 having a couple of apertures 64. These apertures are lined with wear resistant eyelets 21. The eyelets 21 prevents wear of the housing peripheral wall portion 60 around the apertures 64 when the trimmer head 10 is in operation and the trimmer line 22 outside the head is heavily rubbing against the eyelets 21. The eyelets 21 are preferably 180 degrees apart from each other.

The housing central annular pocket 19 projects from the housing upper dome 66 circumscribing the axis of rotation 76. The central annular pocket external wall 67 is cylindrical and provides the bearing surface for the spool 14 rotation around the housing axis of rotation 76. In an alternate embodiment shown by FIG. 12, a portion of the keyed threaded coupler cylindrical surface 24 is aligned with a portion of the external surface of the central annular pocket external wall 67. Under this configuration, a portion of the keyed threaded coupler cylindrical surface 24 becomes the bearing surface for spool 14 rotation. Around the housing peripheral wall 60 are disposed a couple of locking apertures 62 which in cooperation with the lower cover axial lock tabs 55 (FIG. 2 and FIG. 6) axially secures the lower cover 12 against the housing 11 to maintain the internal parts of the trimmer head 10 confined within the housing 11. As shown by FIG. 3a, the housing 11 also includes structural ribs 63 to provide structural strength to the housing 11. In addition to the structural ribs 63 the housing 11 has circumferential ribs 65 that extend radially inwards from the housing peripheral wall portion 60. These ribs 65 in cooperation with the lower cover lock slots 58 (FIG. 6) provide additional anti-rotational means to maintain the lower cover 12 rotationally locked against the housing 11. The ribs 65 also function as a spool-flange housing gap closer to prevent the trimmer line 22 to slide off of the spool flanges 27 and 28 peripheral surface 37.

Figure 4A:
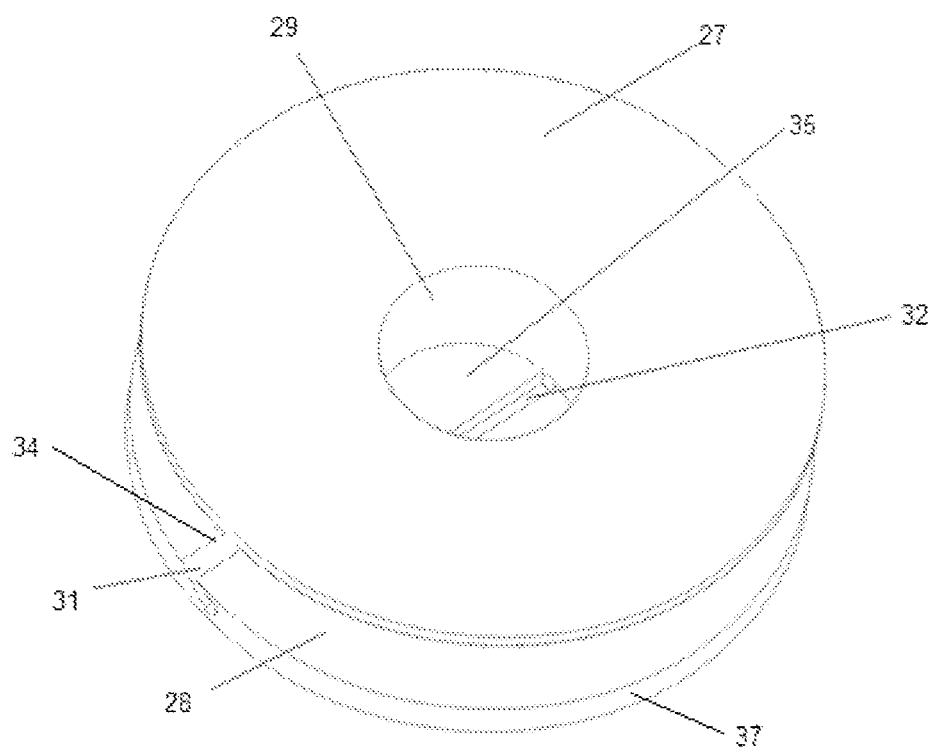
FIG. 4a is an isometric view showing a first embodied design for the spool of the trimmer head object of the present invention.
Figure 4B:
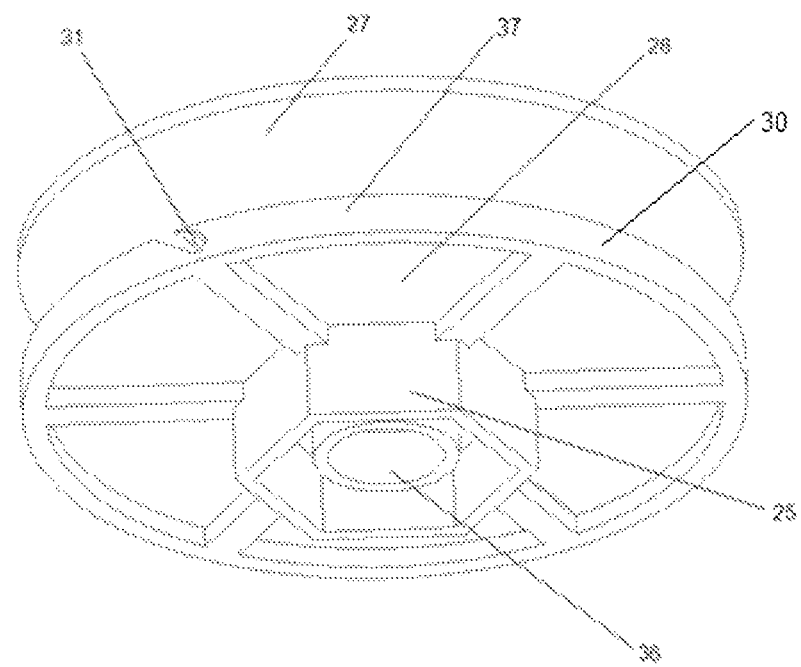
FIG. 4b is an alternate isometric view showing a first embodied design for the spool of the trimmer head object of the present invention.
Figure 4C:
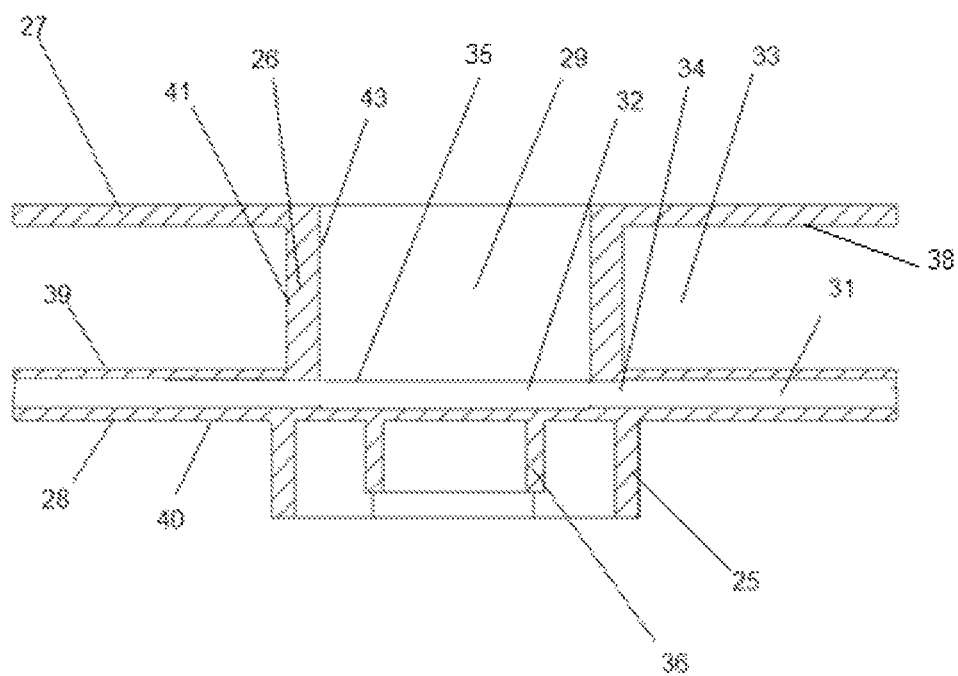
FIG. 4c is a cross sectional view showing a first embodied design for the spool of the trimmer head object of the present invention.
Figure 12:
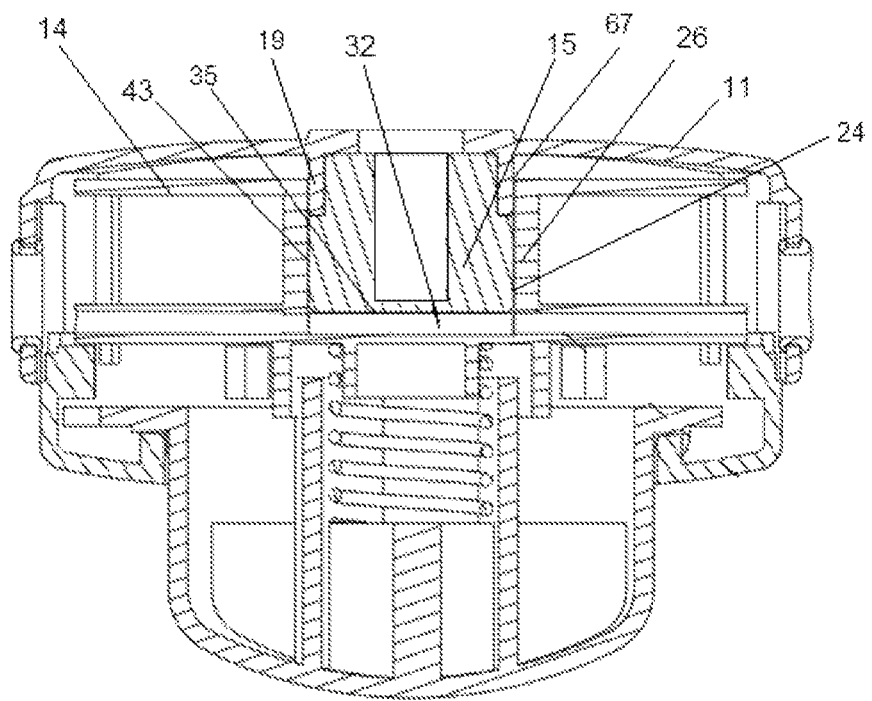
FIG. 12 is a cross sectional view through the axis of rotation of the head assembly to show an alternate configuration of the threaded coupling hub for the trimmer head of the present invention.

FIG. 4a, FIG. 4b and FIG. 4c depict a spool 14 and its features. The spool 14 as shown into the trimmer head assembly 20 by FIG. 1a, FIG. 1b and FIG. 2, is disposed within the trimmer head 10 to receive the trimmer line 22, which extends outside the housing 11. The spool 14 is selectively rotatable relative to the housing 11 around the central annular pocket external wall 67 or around the keyed threaded coupler cylindrical surface 24 as depicted by FIG. 1b and FIG. 12, but does not moves axially within the housing 11 as many of the cutting heads from the prior art to provide the trimmer line feed indexing controls. The spool 14 has a trimmer line storage chamber 33 for storing wound trimmer line 22. The trimmer line storage chamber 33 is delimited by a hollow upper cylindrical flange inner face 38, a lower cylindrical flange inner face 39, and by a spool hollow cylindrical core peripheral surface 30. Although the basic spool configuration is described by having a single trimmer line storage chamber 33, the skilled in the art may recognize that within the described configuration, the spool line storage chamber 33 may be subdivided by adding an extra flange projecting from the hollow cylindrical core 26 to provide separate trimmer line storage chambers 33 for each exiting filament line 22 segments. A central cavity 29 is disposed within the hollow cylindrical core 26 for rotation of the spool 14 around the housing central annular pocket external wall 67 or the keyed threaded coupler cylindrical surface 24. The central cavity 29 is delimited by the spool central cavity inner wall 43 and a central cavity closed face 35. The lower cylindrical flange 28 includes trimmer line guide passages 31 and 32 there through. The trimmer line guide passages 31 and 32 are comprised of two diametrically opposed external trimmer line guide passages 31 and an inner trimmer line guide passage 32 which is a single passage crossing through the spool hollow cylindrical core 26 connecting the two external trimmer line guide passages 31. The external trimmer line guide passages 31 are delimited by the hollow core peripheral surface 30 and the lower cylindrical flange perimeter wall 37. The external trimmer line guide passages 31 are diametrically opposed and mirrored by a plane crossing the spool 14 axis of rotation 76 in a way that separates the two external trimmer line guide passages 31 by 180 degrees. These external trimmer line guide passages 31 comprise open windows 74 disposed over the external cylindrical flange inner face 39. These lower cylindrical flange open windows 74 provide a route for the flexible trimmer line 22 to exit the external flexible trimmer line guide passages 31, so the flexible trimmer line 22 starts winding around the hollow cylindrical core peripheral surface 30 as the knob 13 along with the spool 14 are rotated during manual flexible trimmer line 22 winding.

The inner trimmer line guide passage 32 is disposed over the central cavity closed face 35 delimited by the hollow core peripheral surface 30. Although the spool 14 is made of one piece of injection molded plastic, the different structures within the spool 14 are described as separate entities. Following this method to describe the spool 14 structures, two spool flanges 27 and 28 are being described as projecting cylindrical surfaces from the end faces of the spool cylindrical hollow core 26. Since the three trimmer line guide passages 31 and 32 are embedded into the lower flange 28, for description purposes, the boundaries for these three trimmer line guide passages 31 and 32, are basically the projections or extensions of the hollow spool hollow core peripheral surface 30 and the cylindrical flanges peripheral surface 37. The central cavity closed face 35 provides a trust surface which in cooperation with the keyed threaded coupler lower face 17 maintains the spool 14 axially fixed to the housing 11. The inner trimmer line guide passage 32 is opened at the spool central cavity closed face 35. To maintain the trimmer line 22 within the trimmer line guide inner passage 32 while being threaded through the spool 14, a compression spring 18 biases the spool central cavity closed face 35 against the keyed threaded coupler lower face 17 to fully close the trimmer line guide inner passage 32. The keyed threaded coupler 15 provides several functional features within the cutting head object of the present invention: 1.—Provides the coupling threads to secure the cutting head to the trimmer head driver device. 2.—Provides the proper engagement with the cutting head housing 11 to insure the rotation of the housing 11. 3.—Provides a bearing surface for rotation of the spool 14. 4.—Provides a thrust surface to maintain the spool 14 axially restricted within the trimmer head 10. 5.—Provides a seal for the spool trimmer line guide inner passage open window 34. The inner flexible line guide open window 34 establish the unobstructed communications between the inner passage 32 and the external passages 31. The external passages 31 openings, located in the spool lower cylindrical flange peripheral surface 37, are selectively alignable with one of the pair of eyelets 21 of the housing 11 to feed a trimmer line 22 therethrough the spool trimmer line guide external passage 31 opening at the spool flange peripheral surface 37. FIG. 1b shows a section through the axis of rotation 76 of the trimmer head 10 object of the present invention with a trimmer line 22 threaded through the head assembly, crossing through the housing eyelets 21 and the spool 14.

The lower portion of the spool 14 shown by FIG. 4b, includes a hexagonal protrusion 25 projecting downwards from the outer face 40 of the spool lower cylindrical flange 28, which in cooperation with a matching hexagonal protrusion 49 disposed within the knob 13 (FIG. 5b) provides selectively controlled rotation of the spool 14. Also shown by FIGS. 4b and 4c is the spool spring guide 36 to maintain the spring 18 concentric to the spool 14 axis of rotation 76. The hexagonal shape of the engaging system between the spool 14 and the knob 13 is only exemplary in the features of the invention description and could be implemented in many possible shaped profiles such as ellipsoidal, polygonal, splined ribs or other methods known by the art to rotationally engage the spool 14 to the knob 13 while still allowing axial displacement along the axis of rotation 76.

Figure 5A:
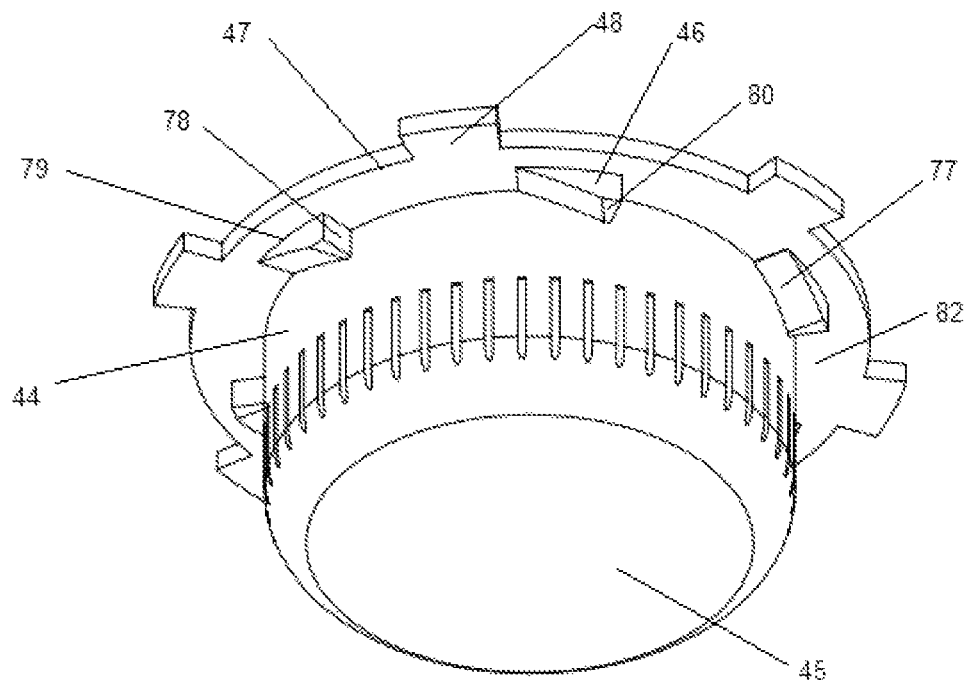
FIG. 5a is an isometric view of the knob showing its features.
Figure 5B:
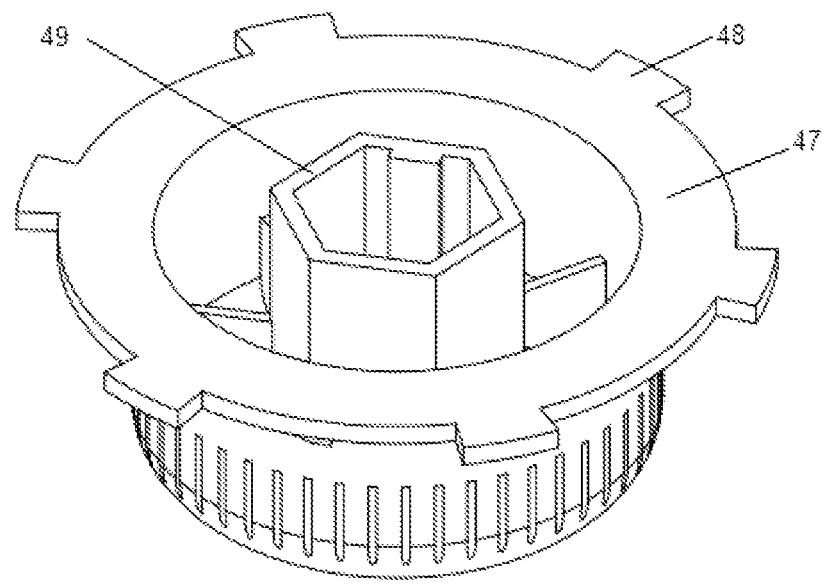
FIG. 5b is an alternate isometric view of the knob showing its features.
Figure 13:
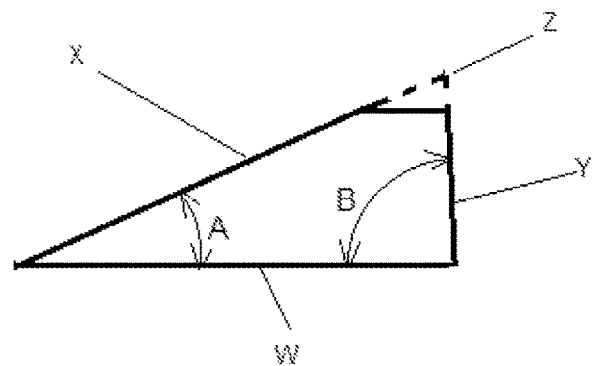
FIG. 13 contains 5 illustrations labeled 13a, 13b, 13c, 13d and 13e. These are schematic views of the teeth geometry and how they interact to provide the stated functions.

The knob 13 structure is depicted by FIG. 5a and FIG. 5b. The knob 13 has a central body comprised by a dome 45 and cylindrical walls portion 44 extending concentric to the knob 13 axis of rotation 76. Extending radially at the upper end of the knob cylindrical wall portion 44 is disposed a flange 47. The flange 47 comprises a plurality of tabs 48 radially extending outwards from the flange 47 perimeter equally spaced angularly. Extending upward from the knob dome 45 along the knob axis of rotation 76 is a hex protrusion 49, which is engagable with the spool hex protrusion 25 to allow relative axial displacement between the knob 13 and the spool 14 and to prevent relative rotational movement between the knob 13 and the spool 14. The knob 13 include a plurality of teeth 46, angularly equidistant and projecting downwards from the knob flange 47 and concentric to the knob cylindrical wall portion 44. The knob teeth 46 are triangular shaped having an inclined surface 77 in one side, a vertical surface 78 on the opposite side, and a base 79 connected to the knob flange lower face 81. The vertex or apex 80 is where the vertical surface 78 intersects the inclined wall 77. The apex 80 may be a truncated apex 83 and the teeth 46 will adopt a trapezoidal shape, which for functional and descriptive purposes apex 80 and truncated apex 83 will be equivalent to the triangular teeth shape herein described. FIG. 13a describes with detail the structure and geometry of the teeth 46, in which side "X" represents the inclined surface 77, side "Y" represents the vertical surface 78, side "W" represents the teeth base 79, that angle "A" represents the angular slope of the inclined surface 77, and the angle "B" represents the angular slope of the vertical surface 78 relative to the base 79. Even though in practice the vertical surface 78 is designated "vertical" for descriptive purposes, in practice it typically contains a draft angle near 90 degrees to facilitate manufacturing. Side "Z" represents the teeth apex 80. The teeth 46 and the tabs 48 comprise the knob rotation control elements.

Figure 6:
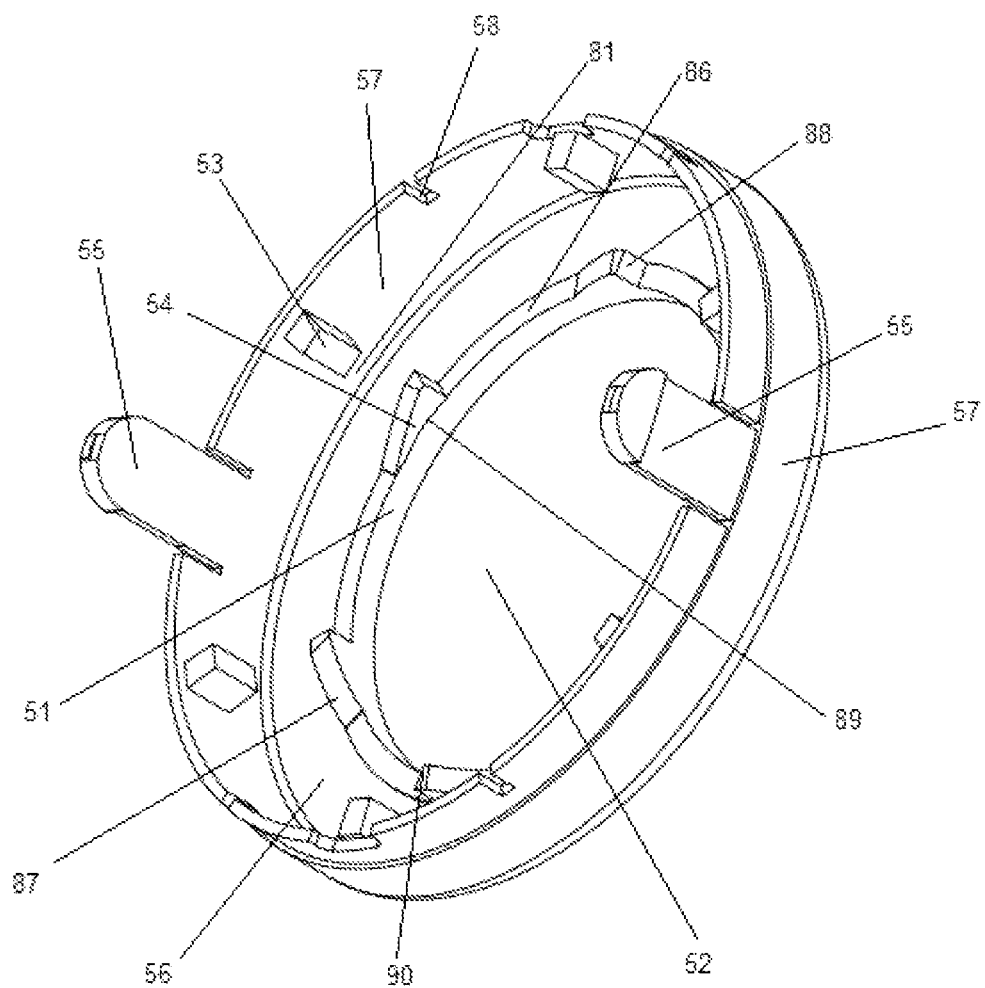
FIG. 6 is an isometric view of the lower cover showing its features.

The lower cover 12 elements are depicted by FIG. 6. The lower cover 12 is releasable attached to the lower edge of the housing 11 cylindrical peripheral wall portion 60 to hold the assembly together. The lower cover 12 is basically a retaining ring having a peripheral wall section 57 designed to engage the lower portion of the housing peripheral wall 60. The lower portion of the lower ring peripheral wall portion 57 merges with a radially oriented wall section 56 that is delimited by a central opening 52. The central opening 52 includes a ring shaped wall 51 that provides rigidity to the lower cover structure and at the same time is utilized as support for a plurality of lower cover teeth 54. The lower cover teeth 54 are similar in shape, number and function to the knob teeth 46 previously described and depicted in detail by FIG. 6 and FIG. 13a. The lower cover teeth 54 are located in the same diametric position as the knob teeth 46 and are disposed over the internal face 86 of the lower cover central opening ring shaped wall 51 in a way illustrated by FIGS. 6 and 13d, in which the knob teeth inclined surface 77 could face the lower ring teeth inclined surface 87. Another important structures within the lower cover 12 are the lower cover retention blocks 53 which are a plurality of structures radially protruding from the internal wall lower cover peripheral wall section internal surface 59. These lower cover retention blocks 53 are equally spaced over the circumference of the internal surface of the lower cover peripheral wall section 59 and they are equal in number to the lower cover teeth 54. The lower cover retention blocks 53 extend over the internal wall lower cover peripheral wall section internal surface 59 in a direction parallel to the lower cover axis of rotation 76 which is common with the head assembly axis of rotation 76 and all rotating features. The lower cover retention blocks 53 are interrupted at the intersection of the lower cover peripheral wall section 59 with the lower cover radially oriented wall section 56 by a lower cover retention blocks gap 81. The height of the lower cover retention blocks gap 81 is designed to allow the passage of the knob flange tabs 48 as it will be explained further in this detailed description. The lower cover teeth 54 and the lower cover retention blocks 53 are the key elements for the lower cover rotation control elements which in cooperation with the knob 13 rotation control elements make possible a ratcheting mechanism combined with an indexing mechanism.

In reference to FIG. 13a, the lower cover teeth 54 are similar to the knob teeth 46 which are shaped as a scalene triangle, in which a first side or hypotenuse is an inclined surface 87 represented in FIG. 13a as the side "X", a second side is a vertical surface 88 represented in FIG. 13a as the side "Y" and a the third side known as the base 89 is where the teeth connects to the supporting surface and it is represented by FIG. 13a as "W". The angle "A" represents the angle of the inclined surface relative to the base or inclined surface 87 slope. This angle which is typically between 5 and 50 degrees, determines the degree of torque to apply to the knob 13 and the required lift to disengage the lower cover teeth 54 from the knob teeth 46. The angle "B" is the angle of the smaller side or vertical surface 88 relative to the base 89. Similarly to the knob teeth 46, for descriptive purposes we are calling this side of the teeth a vertical surface or side, which in reality due to manufacturing processes this inclined surface "Y" is slightly inclined so the angle "B" is less than 90 degrees. The inclined side meets the vertical side is called the apex "Z". Typically the teeth are slightly truncated to avoid the sharper edge at the top of the teeth for functional reasons. The orientation of the lower cover teeth 54 relative to the knob teeth 46, may be described as mirrored and inverted over a plane perpendicular to the trimmer head axis of rotation 76, where the triangles vertical surface 87 and 77 (FIG. 13d) are opposed to each other in a way that allows the knob teeth vertical surface 78 to be in contact with the lower cover teeth vertical surface 88 when the trimmer head 10 is in operation preventing motion of the knob teeth 46 in the direction indicated by the arrow as shown by FIG. 13b, and to allow the knob teeth inclined surface 77, to be in contact with the lower cover teeth inclined surface 87 during the trimmer line 22 winding operation as shown by FIG. 13d allowing knob motion as indicated by the arrows.

External indicators (not shown) viewable from outside the trimmer head 10 may be provided so that the user is aware when the spool external trimmer line guide passage 31 and housing eyelets 21 are aligned and ready for receiving replacement trimmer line 22. In order to wind and release trimmer line 22 from the trimmer head 10, a ratchet system and an indexing system are provided between the rotation control cooperating elements comprised within the lower cover 12 and similar elements comprised within the knob 13. The ratchet system is obtained by the engagement of equally radially distributed teeth located within the knob 13 and equally radially distributed teeth located within the lower cover 12 cooperating with the force of a spring 18 that allows a "wedging" action between the knob teeth 46 and the lower cover teeth 54 as shown by FIG. 13d. The wedging action allows the knob teeth 46 to slide over the lower cover teeth 54 when a predetermined rotational force is applied over the knob 13 allowing the knob teeth 46 to climb over the lower cover teeth 54 biasing the spring 18 force applied over the knob 13. This teeth "jumping" action allows manual knob rotation on one direction only. The ratchet mechanism is used solely for manually winding trimmer line 22 around the spool 14. The ratchet mechanism elements such as the teeth vertical surfaces become part of an indexing system when the features of the elements of the ratchet mechanism permitting rotation in one direction are used to avoid rotation in the opposite direction as shown by FIG. 13*b*, where the configuration of the teeth prevents motion in the direction of the arrow. This mechanism is fully explained further in the description of the invention by FIG. 7*a* through FIG. 7*e*.

Figure 7A:
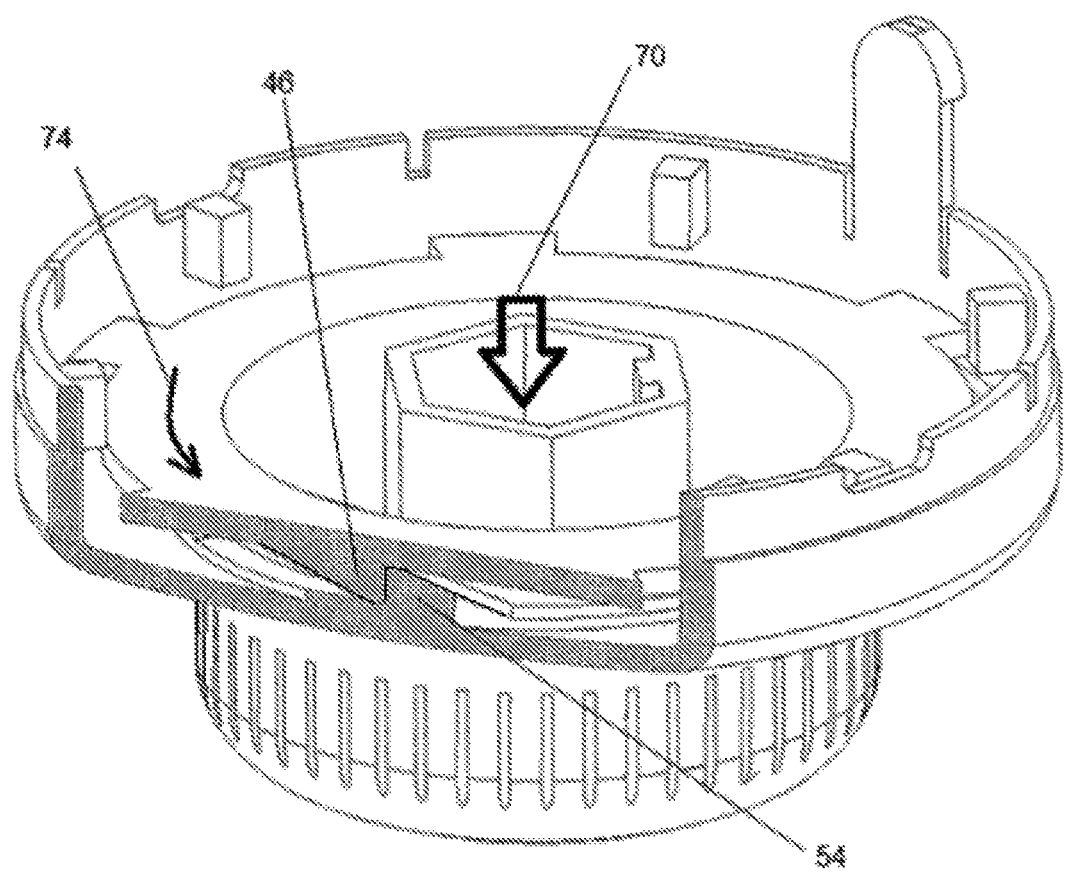
FIG. 7a is a partial section of an isometric view of the lower cover assembled with the knob in extended position during the trimmer head operating mode.
Figure 7B:
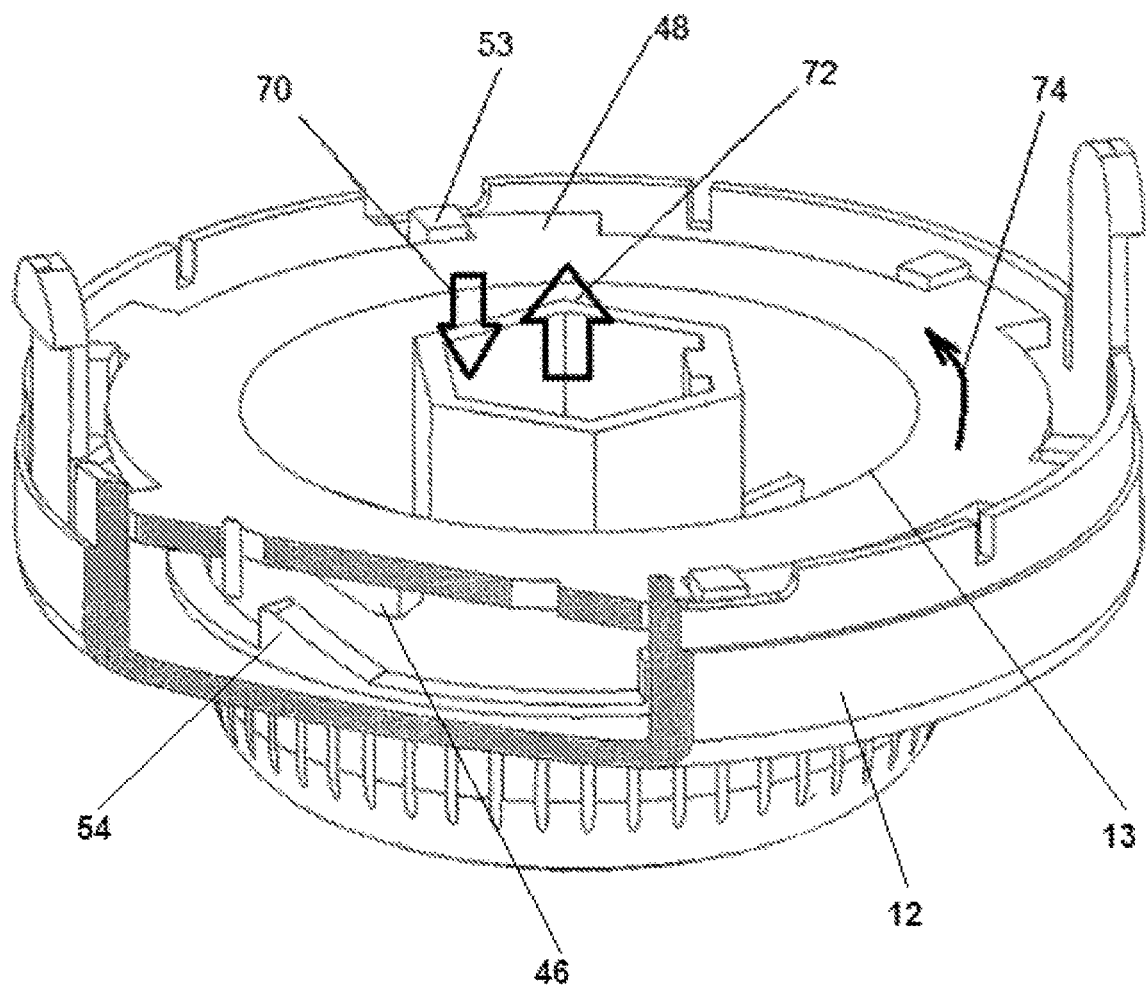
FIG. 7b is a partial section of an isometric view of the lower cover assembled with the knob retracted position in the trimmer head once the knob is bumped.
Figure 13B:
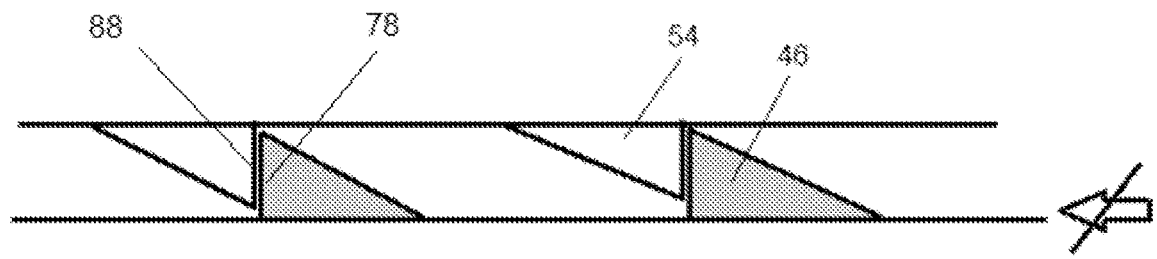
Figure 13C:
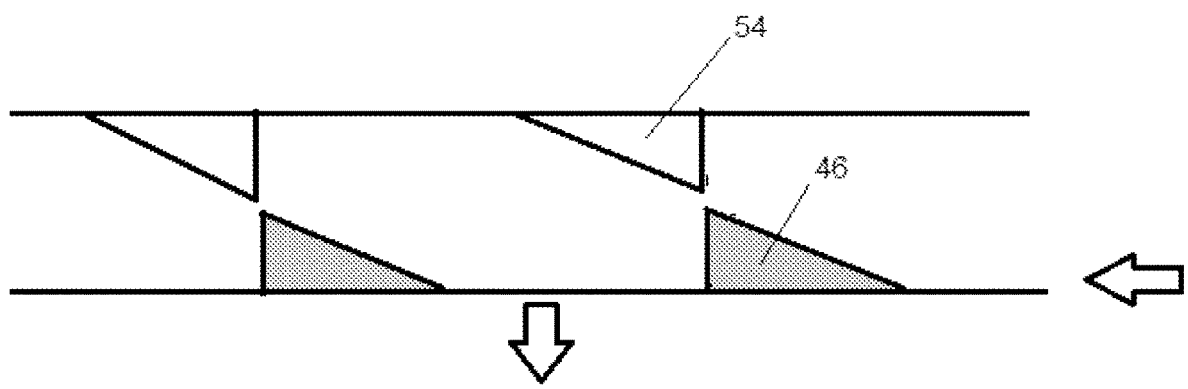
Figure 13D:
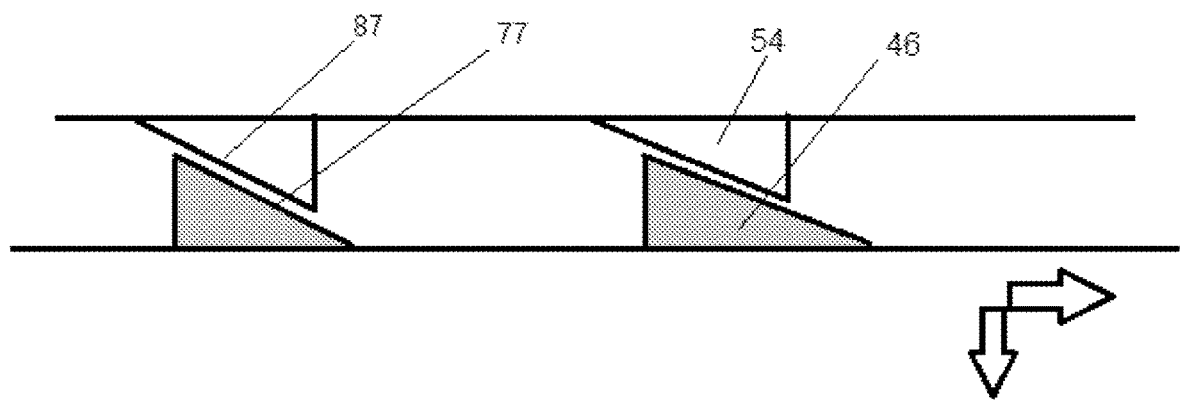

As shown by FIGS. 7*a* and 13*b*, during normal operation, the centrifugal force acting over the trimmer line 22 outside the housing 11 is pulling from the spool 14 and consequently the knob 13 to rotate in the direction 74 in which the knob teeth vertical face 78 will contact the lower cover teeth vertical face 88 while the knob teeth 46 are under the force 70 of the spring 18. This condition will not allow the knob 13 to rotate relative to the lower cover 12 and therefore the spool 14 will not rotate and will not release trimmer line 22 since it is rotationally engaged to the knob 13. Following, as illustrated by FIGS. 7*b* and 13*c*, as the trimmer line 22 wears out, the head is bumped against the ground, the ground pressure forces 72 moves the knob 13 from a locked extended position to its retracted position overriding the force 70 of the spring 18 and disengaging the contact of the vertical walls faces of the corresponding teeth 46 and 54. As the knob teeth 46 disengage the lower cover teeth 54, it reaches its retracted position under the force of the ground pressure 72. In its retracted position the knob 13 flange tabs 48 gets positioned between the angular spacing between the lower cover retention blocks 53. The centrifugal force acting over the trimmer line 22 pulls the spool 14 to rotate in the direction indicated by the arrow 74, as the spool 14 is rotationally engaged to the knob 13, it creates rotational motion of the knob flange tabs 48 till the knob flange tabs 48 gets in contact with the lower cover retention blocks 53 stopping the knob 13 rotation. A portion of trimmer line 22 is released from the spool 14 during this motion.

Figure 7C:
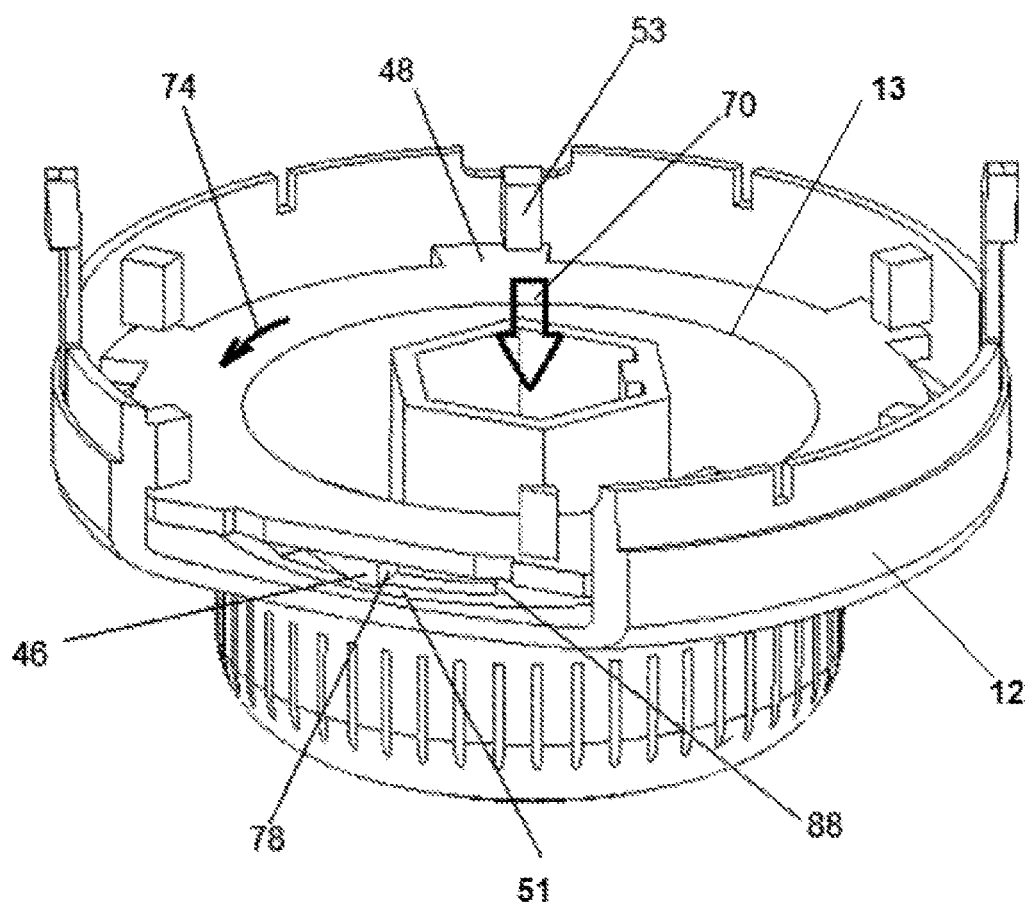
FIG. 7c is a partial section of an isometric view of the lower cover assembled with the knob extended position in the trimmer head once the knob bump is completed and the trimmer head gets ready for operating mode.

As depicted by FIG. 7*c*, when the trimmer head 10 is lifted from contact with the ground, by virtue of the spring force 70 applied over the knob 13, the knob 13 returns to its extended position where the apex of the knob teeth 80 contacts the lower cover teeth central opening ring shaped wall 51 as illustrated by FIG. 13*b*. During this transition, the knob flange tabs 48, axially move to the lowest portion of the lower cover retention blocks 53, and crosses through the retention blocks gap 81 as it rotates in the direction indicated by the arrow 74 till the vertical surfaces of the knob teeth 46 and lower cover teeth 54 gets in contact stopping the knob 13 rotation in its extended position as illustrated by FIG. 13*b*. Another portion of trimmer line 22 is released during this knob extended position rotation.

Figure 7D:
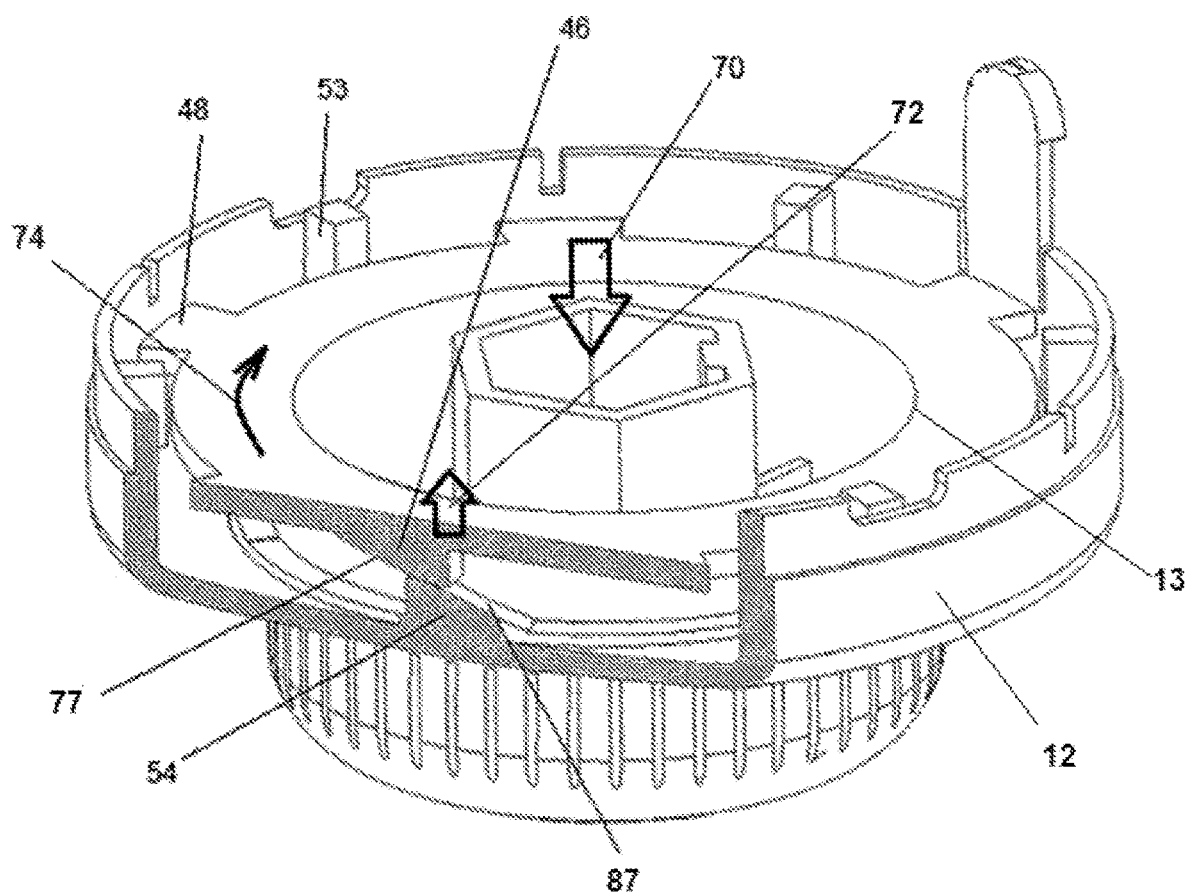
FIG. 7d is a partial section of an isometric view of the lower cover assembled with the knob in the trimmer head at the beginning of the manual winding mode.
Figure 7E:
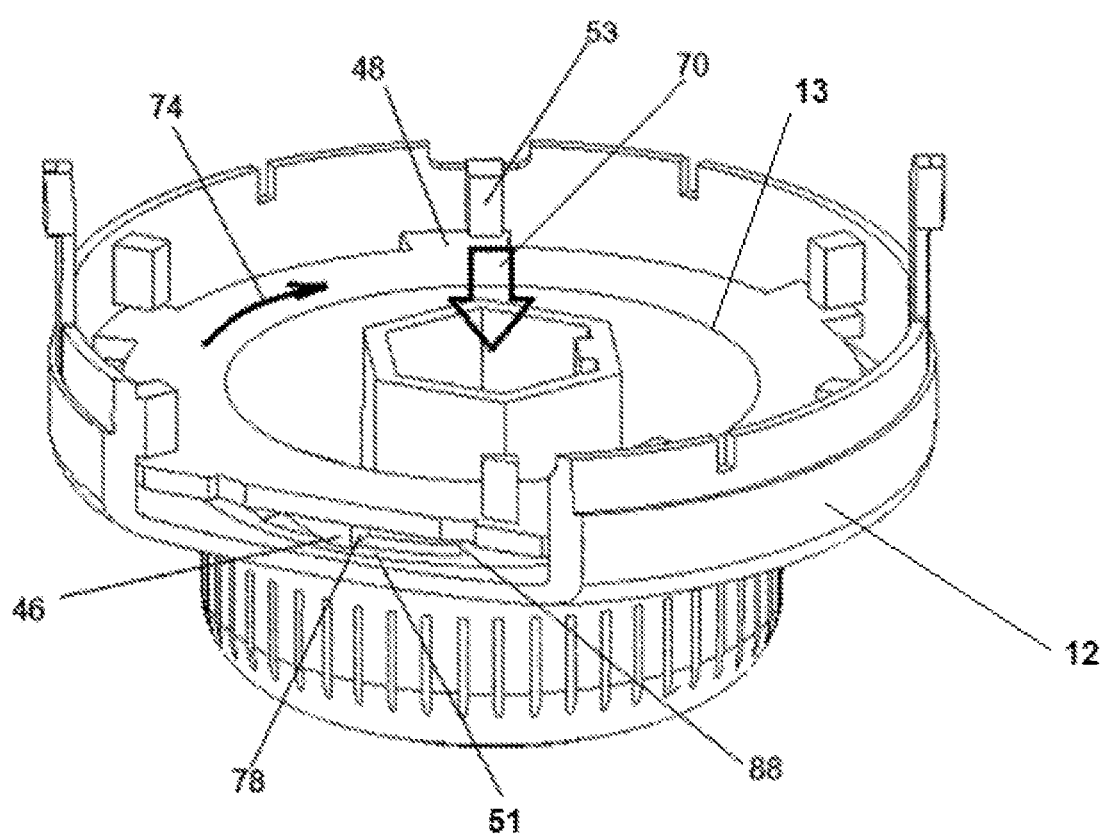
FIG. 7e is a partial section of an isometric view of the lower cover assembled with the knob in the trimmer head at the intermediate position of the manual winding mode.

Unlike the prior art, the indexing mechanism and the ratchet mechanism are solely limited to the iteration of the knob 13 rotation control elements and the lower cover 12 rotation control elements. The knob 13 is allowed to move axially and rotationally around the lower cover central opening 52. When the knob 13 is in an extended position, the spring 18 pushes the knob teeth apex 80 or truncated apex 83 against the inner surface of the central opening ring shaped wall 51. As shown by FIGS. 7*d*, 7*e*, and 13*d*, as the knob 13 is manually rotated in the winding direction 74, which is opposite to the operating direction, the inclined surface of the knob teeth 77 contacts the opposing lower cover inclined surface 87. The torque applied to the knob 13 allows the knob teeth inclined surface 77 to climb over the lower cover teeth inclined surface 87 creating a vertical force 75 that overrides the force 70 of the spring 18. This action temporarily raises the knob teeth 46 above the lower cover teeth 54 temporarily moving the knob 13 to a retracted position. When the knob teeth apex 80 reaches and passes the lower cover teeth apex 90, the spring 18 force pushes the knob 13 to its extended position where the knob teeth apex 80 returns in contact with the lower cover central opening ring shaped wall face 51. With the continuous torque applied to the knob 13, the knob teeth apex 80 slides over the lower cover central opening ring shaped wall internal face 86, till the inclined surfaces of both lower cover teeth 54 and knob teeth 46 gets again in contact to repeat the cycle.

Figure 13E:
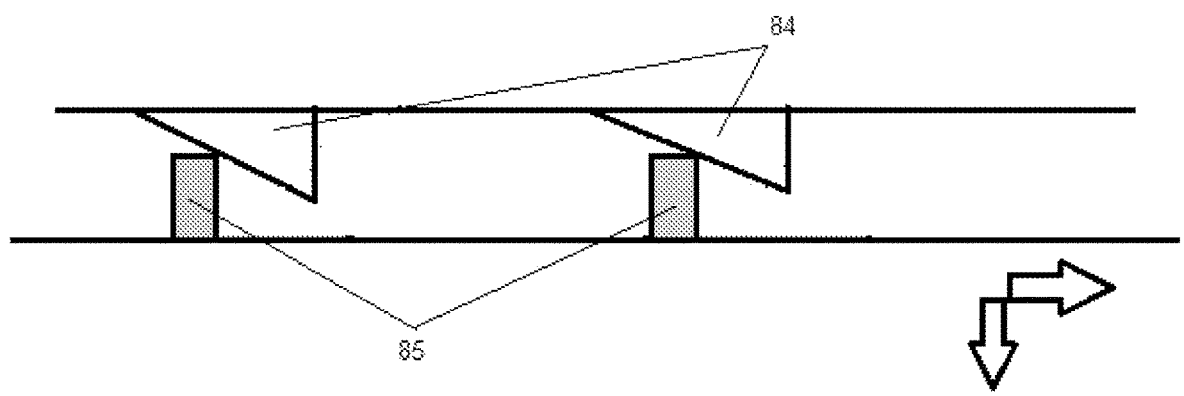

Based on the aforementioned description, the skilled in the art will recognize that for the ratchet mechanism to operate is only necessary any cam-follower combination in which the teeth inclined surface is the cam 84 and a follower 85 may have any shape that is allowed to slide over the inclined surface of the teeth as illustrated by FIG. 13*e*. Cam followers for this type of mechanism may be portions of tabs, teeth, ribs or other shapes that are capable of sliding over an inclined surface in one direction and having a surface that will not allow sliding on the opposite direction. Similarly for the indexing mechanism, angularity between the surfaces of the walls in contact is often used to facilitate the disengagement from the indexing elements without affecting the indexing mechanism. In the detailed description of the cutting head object of the present invention, similar interacting elements are used for illustrative purpose.

Figure 8A:
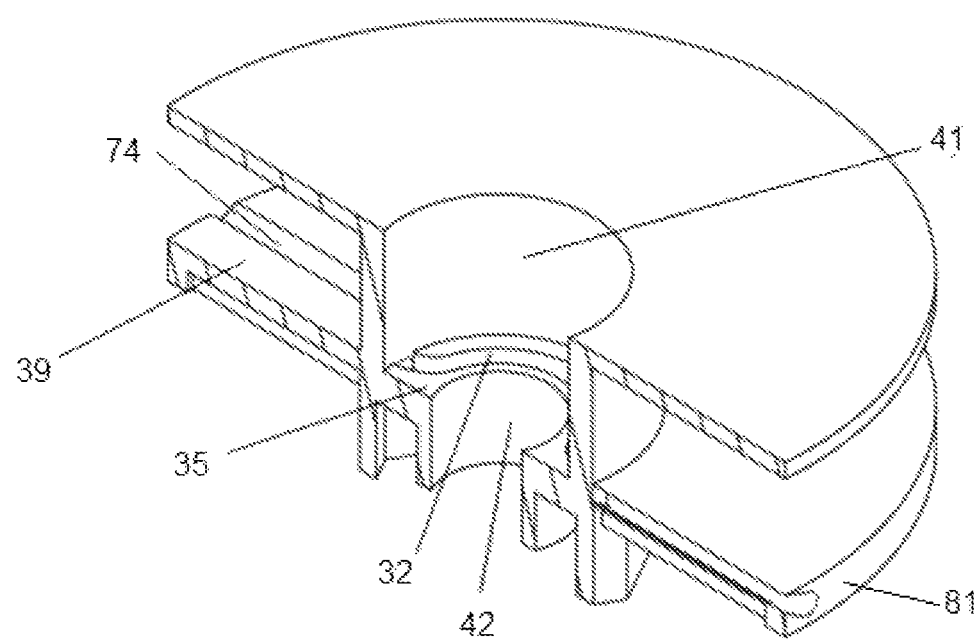
FIG. 8a is an isometric cross sectional view of the spool to depict a second embodied design for the spool for the trimmer head of the present invention when the trimmer apparatus has a drive shaft longer than typical.
Figure 8B:
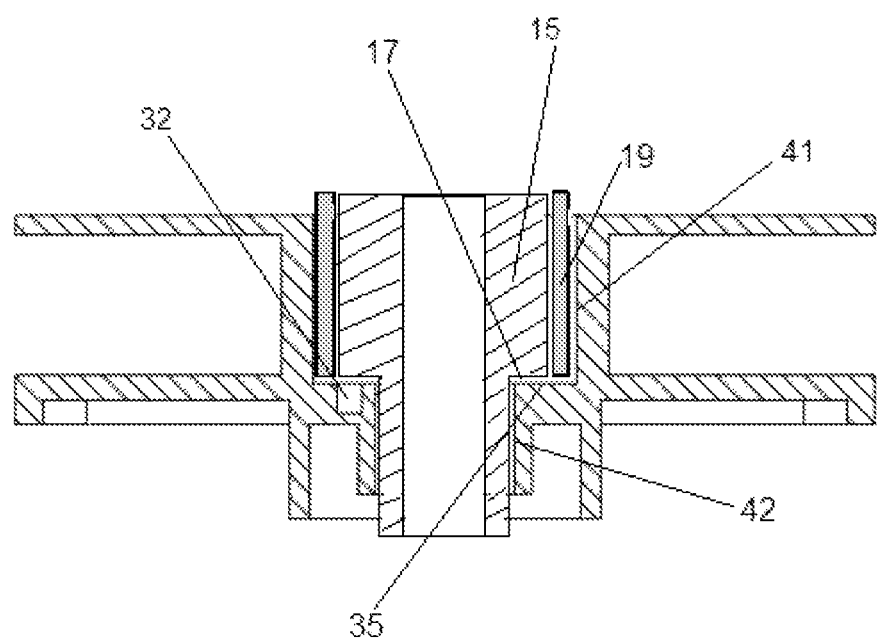
FIG. 8b is a cross sectional view through the axis of rotation of the spool and drive shaft to depict a second embodied design for the spool for the trimmer head of the present invention when the trimmer apparatus has a drive shaft longer than typical.
Figure 9A:
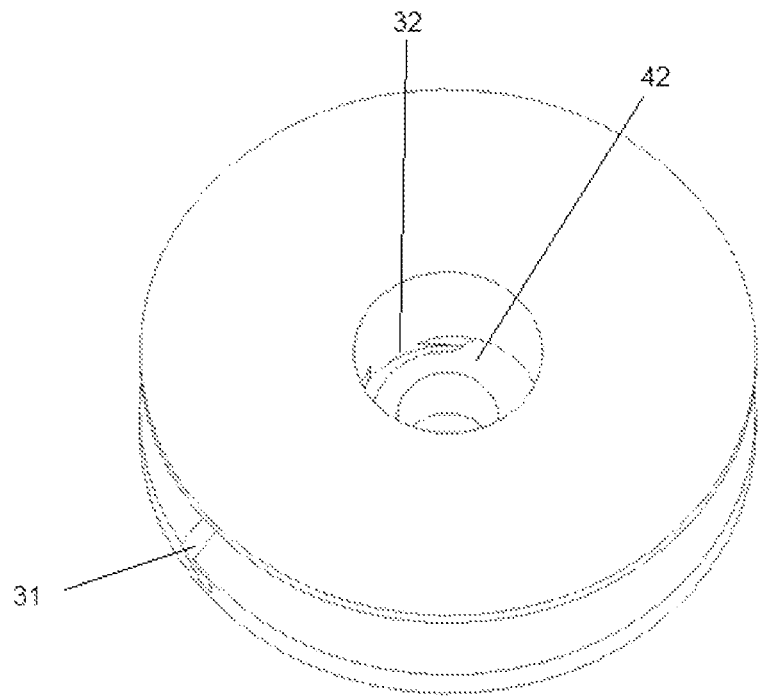
FIG. 9a is an isometric view of the spool and drive shaft to depict a third embodied detail for the spool for the trimmer head of the present invention when the trimmer apparatus has a drive shaft longer than typical.
Figure 9B:
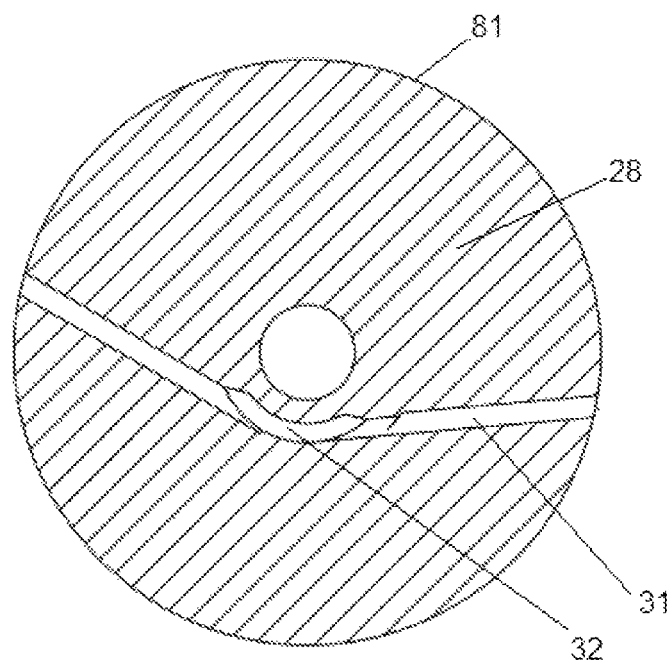
FIG. 9b is a cross sectional view of the spool to show the configuration of the trimmer line passage of the spool to depict a third embodied detail for the spool for the trimmer head of the present invention when the trimmer apparatus has a drive shaft longer than typical.

An alternate spool design is used when the coupling bolt from the trimmer apparatus shaft is longer than the typical shaft, a central cavity closed face hole 42 is provided to allow the trimmer apparatus arbor shaft to extend deeper into the spool hollow cylindrical core 26. The longer coupling bolt creates a barrier for the trimmer line guide inner passage 32 to cross the hollow cylindrical core 26 in a straight direction. This condition is circumvented by creating an inner trimmer line guide passage 31 in a curved path around the coupling arbor shaft extension within the central cavity 29. To accommodate the longer arbor shaft two types of spool configurations are proposed. One design maintains the trimmer line guide external passages 31 radially oriented while the trimmer line guide inner passage 32 is curved around the spool central cavity 29 as shown by FIG. 8*a*. The shoulder of the elongated keyed threaded coupler 15 becomes the keyed threaded coupler thrust surface 17, which will close the upper side of the curved trimmer line guide inner passage 32 as previously done for the straight trimmer line guide inner passage 32 with no extended coupling shafts A second alternate design for allowing a central shaft around the spool 14 is described by FIGS. 9*a* and 9*b*. This alternate design uses trimmer line guide external passages 31 that are not in a radial direction, instead the trimmer line guide external passages 31 are tangent to a segment of arch within the spool central cavity 29 that circumscribes the spool central cavity closed face hole 42 and is inscribed within the internal walls of the spool central cavity cylindrical wall 41. The trimmer line guide external passages 31 are mirrored through a plane crossing the spool 14 axis of rotation 76. The outer end of the trimmer line guide external passages 31 are 180 degrees apart over the spool lower flange perimeter face 37. The upper side of the trimmer line guide inner passage 32 has an open window 34 which is closed by the keyed threaded coupler thrust face 17 as shown by FIG. 8*b*. This configuration allows to feed the trimmer line 22 around an extended central shaft with little deformation and resistance. The wider eyelets 21 allows easy location of the external passages 31 over the spool lower flange perimeter wall 37.

Figure 10A:
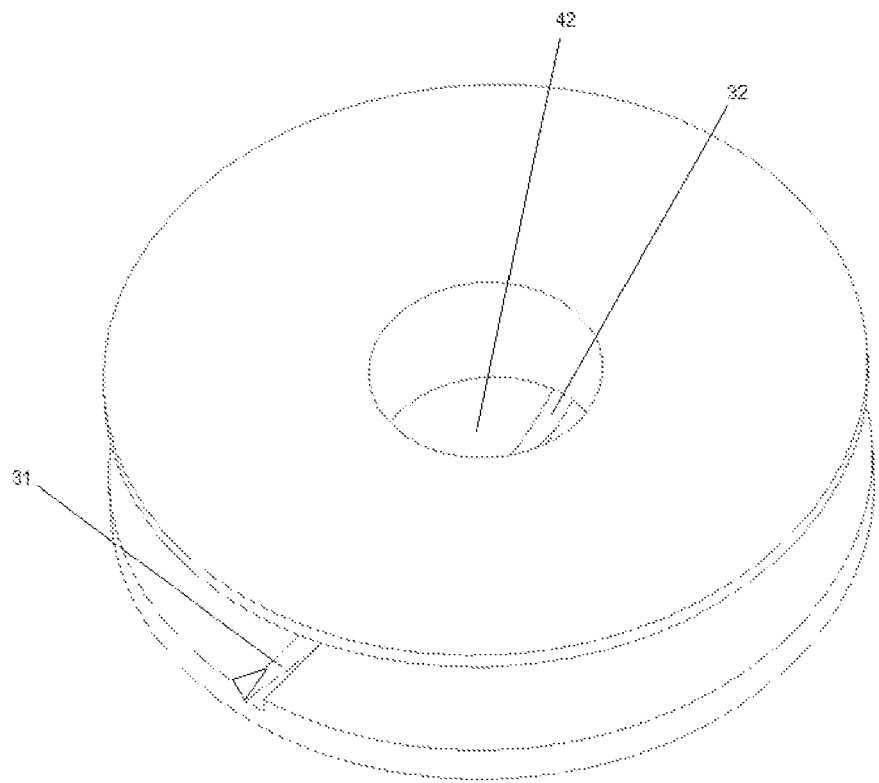
FIG. 10a is an isometric view of the spool and drive shaft to depict a fourth embodied detail for the spool for the trimmer head of the present invention.
Figure 10B:
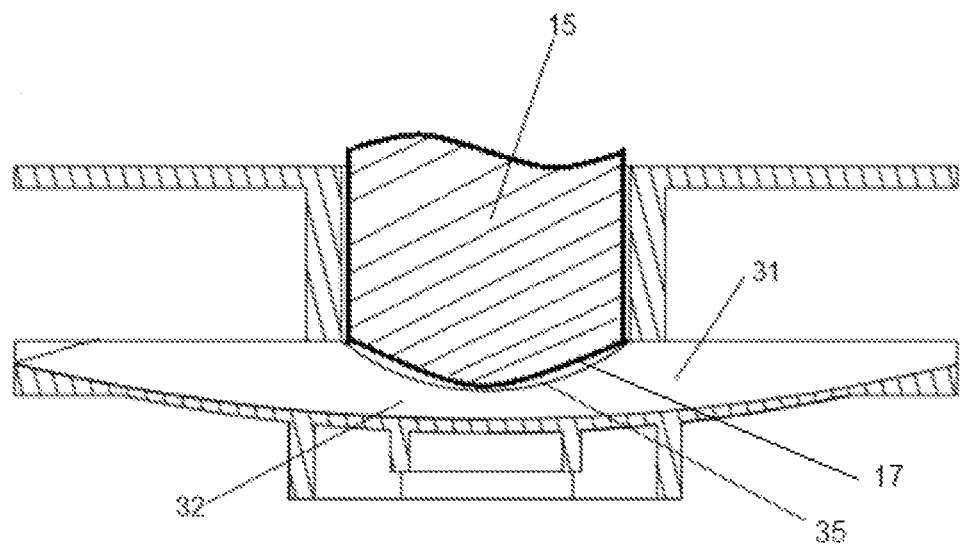
FIG. 10b is a cross sectional view through the axis of rotation of the spool to show the configuration of the trimmer line passage of the spool to depict a fourth embodied detail for the spool for the trimmer head of the present invention.
Figure 11:
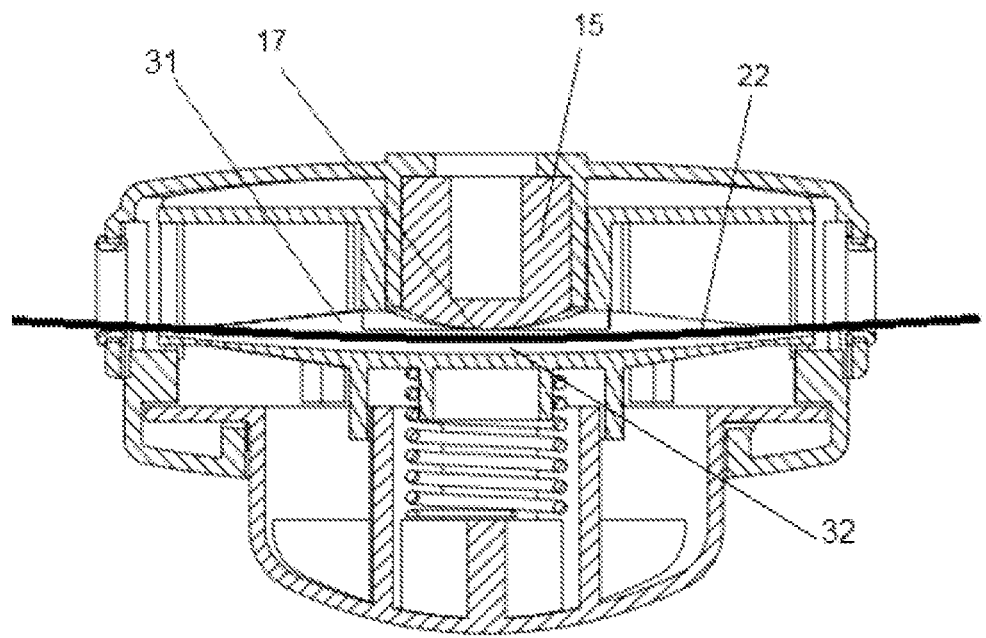
FIG. 11 is a cross sectional view through the axis of rotation of the head assembly to show the configuration of the trimmer line passage of the spool to depict a fourth embodied detail for the spool for the trimmer head of the present invention.

Another yet alternate embodiment of the present invention is shown by FIG. 10a, FIG. 10b and FIG. 11. This configuration includes the spool trimmer line guide passages 31 and 32 for feeding the trimmer line 22 through the spool 14. The spool trimmer line guide passages 31 and 32 are in a radial direction when seen in the plane perpendicular to the spool 14 axis of rotation 82, but in a plane parallel to the spool axis of rotation 76 and through the center section of the trimmer line guide passages 31 and 32, the trimmer line guide passages 31 and 32 are in an arched trajectory. This configuration allows to feed the trimmer line 22 through the spool 14 diametrically straight through without structures blocking the freely movement of the trimmer line 22 within the spool trimmer line storage chamber 33, when the trimmer line is unwinding from the spool 14 during trimmer line 22 dispensing. The eyelets 21 are elongated and wide in order to allow visually aim the tip of the trimmer line 22 into the feed channel on top of the external passage 31. When the trimmer line 22 reaches the entrance of the inner passage 32, the keyed threaded coupler lower face 17 is shaped as a dome matching the concave surface on the spool central cavity closed face 35 to force the trimmer line 22 to bend around the floor of the arcuate trimmer line guide inner passage 32 and through the exiting trimmer line guide external passage 31 over the lower flange peripheral surface 37. The tip of the trimmer line 22 remains in contact with the floor of the arcuate trimmer line guide passages 31 and 32 since it tries to stay straight while being fed through. When the end of the trimmer line 22 emerges through the exiting external trimmer line guide passage 31 over the spool flange peripheral surface 37 and the exiting eyelet 21, the trimmer line 22 is in an angle tangent to the arcuate passage. The elongated shape of the eyelets contributes to wind the trimmer line 22 evenly around the spool hollow cylindrical core 26 during trimmer line 22 winding operation.

FIG. 12 depicts another alternate configuration yet of the trimmer head assembly 10 object of the present invention, where the keyed threaded coupler cylindrical surface 24 is used as the bearing surface for spool 14 rotation. The receiving housing central annular pocket is shortened to allow most of the key threaded coupler cylindrical surface 24 to provide the required support for the spool 14 rotation while maintaining its other functional structures. The direct contact of the keyed threaded coupler cylindrical surface 24 with the spool central cavity inner wall 43 is important to maintain the concentricity with the trimmer head assembly 10 in order to reduce vibrations to a minimum level. Since the cutting heads are manufactured in plastic materials using plastic molding techniques where the parts involved require drafted surfaces and working tolerances, it affects the rotating components concentricity with the trimmer head axis of rotation 76. Minimizing these tolerances by maintain rotating components concentric to the common axis of rotation 76, minimizes the vibration levels.

As the skilled in the art will recognize, the features that differentiate the present invention from the prior art is the simplicity of the components layout and the indexing/ratcheting mechanism provided by the interaction of the knob 13 and the lower cover 12. As the spool 14 does not move axially within the trimmer head assembly 10, this feature allows a simple spool design which also allows a simplified trimmer line guide passages 31 and 32 to guide the trimmer line 22 through the spool 14, instead of adding extra parts to help guiding the trimmer line 22 through the spool core or using complex plastic molding methods which increases the manufacturing cost. Another additional benefit of this configuration is that the eyelets 21 are elongated along the trimmer head axis of rotation 76, which allows to wind the trimmer line 22 in even widenings, differing from the prior art which uses small eyelets and allows stacking of the trimmer line 22 windings around a predetermined zone of the spool trimmer line storage chamber 33. This prior art methodology creates trimmer line 22 sticking within the trimmer line 22 windings within the spool storage chamber 33 and affects trimmer line 22 dispensing. Another advantage of the present configuration is prevention of spool flanges swelling or spreading outwards of the flanges, caused by the line wrapping within the spool trimmer line storage chamber 33 which results when the trimmer line 22 windings within the spool trimmer line storage chamber 33, applies pressure over the flanges 27 and 28, resulting in flanges deformation. In the spool 14 within the trimmer head assembly 10 object of the present invention, trimmer line 22 wedging will not affect the function of the cutting head since the typical indexing elements are not located on the spool flanges 27 and 28, therefore the spool flanges 27 and 28 do not have cooperating structures engaging with the trimmer head housing 11 and spool flanges 26 and 27 could be designed to support larger internal loads Another yet advantage of the present design is the positioning of rotating components in close concentricity to the common axis of rotation 76, therefore reducing vibration levels.

It is understood that the embodiments of the present invention that are illustrated and described are merely exemplary and that a person skilled in the art can make many variations to those embodiments. For instance, the number of tab projections, teeth projections, cooperating surfaces projections can be varied in numbers and shape while the functionality remains the same. Likewise, the shape of the bump knob, the shape of the housing, the shape of the spool and the lower cover/housing locking system can be varied into numerous configurations that are not illustrated and well known by the prior art. All such embodiments are intended to be included within the scope of the present invention as defined by the claims. None of the embodiments need to include any or all of the features of the invention, while this invention has been described as having a preferred design, it is understood that it is capable of further modifications, uses and/or adaptations of the invention following in general the principle of the invention and including such departures the present disclosure as come within the known or customary practice in the art to which the invention pertains and as may be applied to the specific features hereinbefore set forth, and fall within the scope of the invention and the limits of the appended claims, is therefore to be understood that the present invention is not limited to the sole embodiment described above, but encompasses any and all embodiments within the scope of the following claims.

APPLICATION 17/981,751 NUMERICAL REFERENCES

| application Ser. No. 17/981,751 Numerical references | |
|---|---|
| 10 | Trimmer head |
| 11 | Housing |
| 12 | lower cover |
| 13 | knob |
| 14 | spool |

-continued application Ser. No. 17/981,751 Numerical references

| | |
|---|---|
| 15 | keyed threaded coupler |
| 16 | keyed threaded coupling hub spline |
| 17 | keyed threaded coupler thrust face |
| 18 | spring |
| 19 | housing central annular pocket |
| 20 | housing assembly |
| 21 | eyelets |
| 22 | flexible trimmer line |
| 23 | keyed threaded coupler threads |
| 24 | keyed threaded coupler cylindrical surface |
| 25 | spool hexagonal protrusion |
| 26 | spool hollow cylindrical core |
| 27 | spool upper cylindrical flange |
| 28 | spool lower cylindrical flange |
| 29 | spool central cavity |
| 30 | spool hollow cylindrical core peripheral surface |
| 31 | spool trimmer line guide external passage |
| 32 | spool trimmer line guide inner passage |
| 33 | spool trimmer line storage chamber |
| 34 | spool inner flexible trimmer line guide open window |
| 35 | spool central cavity closed face |
| 36 | spool spring guide |
| 37 | Spool flange peripheral surface |
| 38 | Spool upper flange inner face |
| 39 | Spool lower flange inner face |
| 40 | Spool lower flange outer face |
| 41 | Spool central cavity cylindrical wall |
| 42 | spool central cavity closed face hole |
| 43 | Spool central cavity inner wall |
| 44 | knob peripheral wall portion |
| 45 | knob dome |
| 46 | knob teeth |
| 47 | knob flange |
| 48 | knob flange tabs |
| 49 | knob central hexagon protrusion |
| 50 | Knob hexagon key |
| 51 | lower cover central opening ring shaped wall |
| 52 | lower cover central annular opening |
| 53 | lower cover retention blocks |
| 54 | lower cover teeth |
| 55 | lower cover axial lock tabs |
| 56 | lower cover radially oriented wall section |
| 57 | lower cover peripheral wall section |
| 58 | lower cover lock slots |
| 59 | lower cover peripheral wall section internal surface |
| 60 | housing peripheral wall portion |
| 61 | housing center hole |
| 62 | housing locking apertures |
| 63 | housing structural ribs |
| 64 | housing apertures |
| 65 | Housing peripheral wall ribs |
| 66 | housing upper dome |
| 67 | housing central annular pocket external walls |
| 68 | housing central annular pocket key |
| 69 | Line centrifugal force |
| 70 | Spring force |
| 71 | line pull force |
| 72 | ground pressure |
| 73 | torque force |
| 74 | Spool external trimmer line guide open window |
| 75 | lower cover retention blocks gap |
| 76 | Trimmer head axis of rotation |
| 77 | knob teeth inclined surface |
| 78 | knob teeth vertical surface |
| 79 | knob teeth base |
| 80 | Knob teeth apex |
| 81 | Lower cover retention blocks gap |
| 82 | Knob flange lower face |
| 83 | knob teeth truncated apex |
| 84 | Generic teeth |
| 85 | Generic cam follower |
| 86 | Lower cover ring shaped wall internal face |
| 87 | Lower cover teeth inclined surface |
| 88 | Lower cover teeth vertical surface |

-continued application Ser. No. 17/981,751 Numerical references

| | |
|---|---|
| 89 | Lower cover teeth base |
| 90 | Lower cover teeth apex |
| 91 | |

What is claimed is:

1. A cutting head device for a flexible trimmer line mowing machine comprising:

a housing having cylindrical walls including a pair of diametrically opposed apertures for allowing each end of an associated flexible trimmer line to protrude therethrough and a central annular cylindrical pocket; said housing comprising an axis of rotation, a keyed threaded coupler disposed within said housing central annular cylindrical pocket, where said keyed threaded coupler comprising a threaded end for attaching said housing to said flexible line trimmer mowing machine, and a thrust face opposite to said threaded end;

a lower cover releasable coupled to said housing to gain access to the interior of said housing, wherein said lower cover comprises a cylindrical wall section and a radial wall section extending radially outwards from a central annular opening of said lower cover, and said lower cover comprising cooperatively interengagable rotation control means;

a knob disposed within said central annular opening of said lower cover and protruding axially downwardly from said lower cover central annular opening, wherein said knob comprises a peripheral wall portion circumscribing said housing axis of rotation, said peripheral wall portion having an external face and a radially extending knob flange projecting from said peripheral wall portion external face, wherein said knob is rotationally and axially movable relative thereto between an extended position and a retracted position, where spring means are provided for biasing said knob towards said extended position, and said knob comprising cooperatively interengagable rotation control means; and a spool rotatably disposed within said housing around an axis of rotation for storing the flexible trimmer line, said spool comprising a hollow cylindrical core including a hollow cylindrical core peripheral surface and two end faces, a central cavity concentrically disposed within said hollow cylindrical core, said central cavity having an open face, a closed face and a cylindrical wall section concentric to said hollow cylindrical core peripheral surface, said closed face for providing a thrust surface, said central cavity cylindrical wall section for rotatively engaging said spool to said housing, extending axially and radially from a first end face of one of said two end faces of said hollow cylindrical core is disposed an upper hollow cylindrical flange, and extending axially and radially from a second end face of the other of said two end faces is disposed a lower cylindrical flange, said lower cylindrical flange having an inner face and an outer face, where said lower cylindrical flange comprising a flexible trimmer line guide sandwiched between said lower cylindrical flange inner face and said lower cylindrical flange outer face, said spool lower cylindrical flange outer face comprising means to rotatably engage said knob to said spool and to receive an end of said spring means which biases said spool central cavity closed face against said keyed threaded coupler thrust face;

wherein when said cutting head device is in normal operation, said knob cooperatively interengagable rotation control means in cooperation with said lower cover cooperatively interengagable rotation control means locks said spool from rotation relative to said housing for constraining said flexible trimmer line from extending outside said housing apertures, and when said knob is shifted from said extended position to said retracted position and back to said extended position, segments of said flexible trimmer line are released outside said housing, and when said cutting head device is in a condition to be refilled with a new flexible trimmer line, said knob cooperatively interengagable rotation control means in cooperation with said lower cover cooperatively interengagable rotation control means allow said knob to be manually rotated in one direction relative to said lower cover for winding said new flexible trimmer line into said spool, being the winding direction of rotation opposite to the spool rotational direction in which new segments of said new flexible trimmer line are released.

2. The cutting head device of claim 1, wherein said spool flexible trimmer line guide is comprised of three flexible trimmer line guide sections including two external flexible trimmer line guide sections and an inner flexible trimmer line guide section, crossing diametrically through said spool lower cylindrical flange, wherein said two external flexible trimmer line guide sections of said three flexible trimmer line guide sections are diametrically opposed to each other and are radially extending from the boundaries of said hollow cylindrical core peripheral surface to the periphery of said spool lower cylindrical flange, and said inner flexible trimmer line guide section of said three flexible trimmer line guide sections, diametrically crossing through said hollow cylindrical core and aligned in unobstructed communication with said two external flexible trimmer line guide sections of said three flexible trimmer line guide sections, wherein said two external flexible trimmer line guide sections of said three flexible trimmer line guide sections having an open window disposed over the inner face of said spool lower cylindrical flange, and said inner flexible trimmer line guide section of said three flexible trimmer line guide sections having an open window disposed over said central cavity closed face and wherein said inner flexible trimmer line guide section of said three flexible trimmer line guide sections open window being covered by said keyed threaded coupler thrust face for facilitating insertion of said flexible trimmer line through said spool hollow cylindrical core.

3. The cutting head device of claim 1, wherein said spool flexible trimmer line guide is comprised of three flexible trimmer line guide sections including two external flexible trimmer line guide sections and an arcuate inner flexible trimmer line guide section, diametrically crossing through said lower cylindrical flange and said hollow cylindrical core, wherein said two external flexible trimmer line guide sections of said three flexible trimmer line guide sections are diametrically opposed to each other and radially extending from said hollow cylindrical core peripheral surface to the periphery of said lower cylindrical flange, and wherein said arcuate inner flexible trimmer line guide section of said three flexible trimmer line guide sections are diametrically crossing through said spool hollow cylindrical core peripheral surface aligned in an unobstructed communication with said two external flexible trimmer line guide sections of said three flexible trimmer line guide sections, wherein said two external flexible trimmer line guide sections of said three flexible trimmer line guide sections having an open window disposed over the inner face of said spool lower cylindrical flange, and said arcuate inner flexible trimmer line guide section of said three flexible trimmer line guide sections is disposed over said spool central cavity closed face, wherein said closed face is shaped as a concave surface, said arcuate inner flexible trimmer line guide section of said three flexible trimmer line guide sections, having an open window disposed over said arcuate inner flexible line guide section, said central cavity closed face window being covered by said keyed threaded coupler thrust face which is shaped as a convex surface and wherein said spool three flexible trimmer line guide sections have a common arcuate shape to guide said flexible trimmer line through said cylindrical hollow core and said spool lower flange in a curved path for facilitating insertion of said flexible trimmer line through said spool.

4. The cutting head device of claim 1, wherein said spool flexible trimmer line guide is comprised of three trimmer line guide sections including two external flexible trimmer line guide sections and an semi-circular inner flexible trimmer line guide section, crossing through said spool lower cylindrical flange and said hollow cylindrical core in a non-radial direction, wherein said two external flexible trimmer line guide sections of said three flexible trimmer line guide sections are mirrored by a plane crossing through said spool axis of rotation and extending from said hollow cylindrical core peripheral surface to the periphery of said lower cylindrical flange and wherein said semi-circular inner flexible trimmer line guide section of said three flexible trimmer line guide sections disposed within said spool central cavity closed face and tangentially connected in unobstructed communication to said two external flexible trimmer line guide sections of said three flexible trimmer line guide sections, wherein said two external flexible trimmer line guide sections of said three flexible trimmer line guide sections having an open window disposed over the inner face of said lower cylindrical flange, and said semi-circular inner flexible trimmer line guide section of said three flexible trimmer line guide sections having an open window disposed over said spool central cavity closed face and wherein said semi-circular inner flexible trimmer line guide section of said three flexible trimmer line guide sections open window being covered by said keyed threaded coupler thrust face for facilitating insertion of said flexible trimmer line through said spool hollow cylindrical core.

5. The cutting head device of claim 1, wherein said knob cooperatively interengagable rotation control means are comprised of a plurality of circumferentially spaced knob flange tabs projecting radially outwardly from said knob flange and a plurality of circumferentially spaced knob teeth projecting in a direction generally concentric to said knob peripheral wall portion and around said knob peripheral wall portion external face, and wherein said lower cover cooperatively interengagable rotation control means are comprised of a plurality of circumferentially spaced lower cover retention blocks projecting radially inwardly from said lower cover cylindrical wall section and a plurality of circumferentially spaced lower cover teeth projecting in a direction parallel to said knob peripheral wall portion and concentric to said lower cover central annular opening.

6. The cutting head device of claim 5, wherein each of said lower cover teeth and each of said knob teeth comprising an inclined surface and a vertical surface, wherein said inclined surface having a slope between 5 degrees and 50 degrees.

7. A cutting head device for a flexible trimmer line mowing machine comprising:
- a housing having coupling means for axially and rotationally attach said housing to said flexible trimmer line mowing machine wherein said coupling means comprising a thrust face;
- a lower cover releasable coupled to said housing comprised of a radial wall portion extending outwards from a central opening of the lower cover and a peripheral wall section extending vertically from the periphery of said radial wall portion, wherein said lower cover comprises cooperatively interengagable rotation control means;
- a spool rotationally disposed within said housing around an axis of rotation for storing a predetermined amount of a flexible trimmer line, said spool comprised of a hollow cylindrical core, cylindrical flanges each radially extending from said hollow cylindrical core and a central cavity including a closed face, wherein said spool comprising a flexible trimmer line guide to insert a portion of the flexible trimmer line throughout wherein a portion of said flexible trimmer line guide is covered by said coupling means thrust face; and
- bumping means comprised of a radially extending wall, a peripheral wall portion, and a bumping surface, said bumping means rotationally engaged to said spool for releasing segments of the flexible trimmer line during operation and for manually winding the flexible trimmer line onto said spool, said bumping means rotationally and axially disposed within said lower cover central opening and comprising cooperatively interengagable rotation control means.

8. The cutting head device of claim 7, wherein said bumping means cooperatively interengagable rotation control means are comprised of a plurality of circumferentially spaced flange tabs projecting radially outwardly from said bumping means radially extending wall and a plurality of circumferentially spaced teeth projecting in a direction generally parallel and concentric to said peripheral wall portion and wherein said lower cover cooperatively interengagable rotation control means are comprised of a plurality of circumferentially spaced lower cover retention blocks projecting radially inwardly from said lower cover peripheral wall section, separated from said radial wall portion for a gap, and a plurality of circumferentially spaced lower cover teeth projecting in a direction generally parallel to said peripheral wall section and radially concentric to said lower cover central opening.

9. The cutting head device of claim 7, wherein said spool flexible trimmer line guide is disposed within one of said spool cylindrical flanges, wherein said spool flexible trimmer line guide is comprised of three flexible trimmer line guide sections including two external flexible trimmer line guide sections and an inner flexible trimmer line guide section, crossing diametrically through one of said spool cylindrical flanges and said hollow cylindrical core, wherein said two external flexible trimmer line guide sections of said three flexible trimmer line guide sections are diametrically opposed to each other and radially extending from said hollow cylindrical core to the periphery of one of cylindrical flanges, and said inner flexible trimmer line guide section of three flexible trimmer line guide sections diametrically crossing through said hollow cylindrical core in alignment and in unobstructed communication with said two external flexible trimmer line guide sections of said three flexible trimmer line guide sections, wherein said two external flexible trimmer line guide sections of said three flexible trimmer line guide sections having an open window disposed over a face of said one of said cylindrical flanges, and wherein said inner flexible trimmer line guide section of said three flexible trimmer line guide sections having an open window disposed over said central cavity closed face, wherein said inner flexible trimmer line guide section open window being covered by said coupling means thrust face to facilitate flexible trimmer line insertion.

10. The cutting head device of claim 7, wherein said spool flexible trimmer line guide is disposed within one of said cylindrical flanges, having three flexible trimmer line guide sections including two external flexible trimmer line guide sections and an arcuate inner flexible trimmer line guide section, crossing diametrically through said one of said spool cylindrical flanges, wherein said two external flexible trimmer line guide sections of said three flexible trimmer line guide sections are diametrically opposed to each other and radially extending from said spool hollow cylindrical core to the periphery of said one of said spool cylindrical flanges, and said arcuate inner flexible trimmer line guide section of said three flexible trimmer line guide sections diametrically crossing through said spool hollow cylindrical core in alignment and in unobstructed communication with said two external flexible trimmer line guide sections of said three flexible trimmer line guide sections, wherein said two external flexible trimmer line sections of said three flexible trimmer line guide sections having an open window within a face of said one of said spool cylindrical flanges, and said arcuate inner flexible trimmer line guide section of said three flexible trimmer line guide sections disposed within said spool central cavity closed face, wherein said spool central cavity closed face being concave and including an open window, wherein said arcuate inner flexible line guide section open window is covered by said coupling means thrust face for deflecting said spool flexible trimmer line through an arcuate path.

11. The cutting head device of claim 7, wherein said spool flexible trimmer line guide is disposed within one of said cylindrical flanges, wherein said spool flexible trimmer line guide is comprised of three flexible trimmer line guide sections including two external flexible trimmer line guide sections and a semi-circular inner flexible trimmer line guide section crossing through said one of said cylindrical flanges in a non-radial direction, wherein said two external flexible trimmer line guide sections of said three flexible trimmer line guide sections are mirrored by a plane crossing through said spool axis of rotation and extending from said hollow cylindrical core to the periphery of said one of said cylindrical flanges, and said semi-circular inner flexible trimmer line guide section of said three flexible trimmer line guide sections tangentially connected in an unobstructed communication to said two external flexible trimmer line guide sections of said three flexible trimmer line guide sections within said central cavity closed face, wherein said two external flexible trimmer line guide sections of said three flexible trimmer line guide sections having an open window within a face of said one of said spool cylindrical flanges, and said semi-circular inner flexible trimmer line guide section of said three flexible trimmer line guide sections having an open window within said spool central cavity closed face which is covered by said coupling means thrust face to facilitate flexible trimmer line insertion.

12. The cutting head device of claim 7, wherein said lower cover cooperatively interengagable rotation control means in cooperation with said bumping means cooperatively interengagable rotation control means allows manual unidirectional rotation of said bumping means relative to said lower cover by a biasing force of spring means wherein said unidirectional rotation is opposite to the spool direction of rotation while operating for externally winding said flexible trimmer line onto said spool.

13. The cutting head device of claim 7, wherein said bumping means having an extended position and a retracted position, the shifting of said bumping means between said extended positions and said retracted position allows a controlled rotation of said bumping means relative to said lower cover for releasing controlled amounts of the flexible trimmer line.

14. A cutting head device for a flexible trimmer line mowing machine comprising:

housing means for enclosing internal components of said cutting head device and having an upper body and a lower cover wherein said upper body having a generally cylindrical sidewall with at least two apertures formed therein, and being releasable coupled to said lower cover for gaining access to the interior of said housing means, said lower cover having a central opening, a cylindrical sidewall portion concentric with said housing cylindrical sidewall and a radial wall portion extending outwardly from said central opening to join said cylindrical sidewall portion;

coupling means for coupling the housing upper body to a drive shaft of said flexible trimmer line mowing machine for rotation of said cutting head device, said coupling means having a thrust face;

spool means for storing a flexible trimmer line, rotationally disposed within the housing means around an axis of rotation, constrained from axial movement relative to said housing means by said thrust face of said coupling means, said spool means comprised of a cylindrical hollow core, a central cavity concentric to said cylindrical hollow core, a central cavity closed face and at least two cylindrical flanges radially extending from said cylindrical hollow core, a supply of said flexible trimmer line wound on the spool means with free ends extending through said housing means apertures;

ground bumping means for controlled release of segments of said flexible trimmer line, protruding from said central opening of said lower cover having a generally cylindrical wall portion, a radially extending flange and a ground engaging face, wherein said ground bumping means are rotationally engaged to said spool means for locking said spool means against rotation relative to said housing means when said ground bumping means is in an extended position and for permitting a first predetermined rotational increment of said spool means relative to said housing means as said ground bumping means is moved from said extended position to a retracted position and a second predetermined rotational increment of said spool means relative to said housing means as said ground bumping means is moved from said retracted position back to said extended position; and cooperatively interengagable rotation control means disposed onto said housing means lower cover and said ground bumping means for controlled rotation of said spool means;

spring means disposed between said spool means and said ground bumping means for biasing the ground bumping means to said extended position and for biasing said spool means towards said thrust face of said coupling means to maintain said spool means in a fixed rotational plane relative to said housing means, wherein said ground bumping means rotatively movable relative to said housing means in a direction opposite to an operating direction for manually winding a replacement flexible trimmer line onto said spool means.

15. The cutting head device of claim 14, wherein said spool means comprising a flexible trimmer line guide disposed within one of said cylindrical flanges, wherein said spool means flexible trimmer line guide is comprised of three flexible trimmer line guide sections including two external flexible trimmer line sections and an inner flexible trimmer line section, crossing diametrically through said one of said cylindrical flanges, wherein said two external flexible trimmer line guide sections of said three flexible trimmer line guide sections are diametrically opposed to each other and radially extending from said cylindrical hollow core to the periphery of said one of said cylindrical flanges, and said inner flexible trimmer line guide section of said three flexible trimmer line guide sections is diametrically crossing through said cylindrical hollow core aligned with said two external flexible trimmer line guide sections of said three flexible trimmer line guide sections and disposed within said central cavity closed face in unobstructed communication with said two external flexible trimmer line guide sections of said three flexible trimmer line guide sections, wherein said two external flexible trimmer line guide sections of said three flexible trimmer line guide sections having an open window disposed over a face of said one of said cylindrical flanges, and said inner flexible trimmer line guide section of said three flexible trimmer line guide sections having an open window disposed over said central cavity closed face and wherein said inner flexible trimmer line guide section open window being covered by said thrust face of said coupling means for maintaining the flexible trimmer line constrained within said inner flexible trimmer line guide section of said three flexible trimmer line guide sections.

16. The cutting head device of claim 15, wherein said ground bumping means having means to indicate when said spool means external flexible trimmer line guide sections are exposed through said upper body apertures.

17. The cutting head device of claim 14, wherein said spool means comprising a flexible trimmer line guide disposed within one of said cylindrical flanges, wherein said spool means flexible trimmer line guide is comprised of three flexible trimmer line guide sections including two external flexible trimmer line guide sections and a semicircular inner flexible trimmer line guide section, crossing through said one of said cylindrical flanges and said cylindrical hollow core in a non-radial direction, wherein said two external flexible trimmer line guide sections of said three flexible trimmer line guide sections are mirrored by a plane crossing through said spool axis of rotation and extending from said cylindrical hollow core to the periphery of said one of said cylindrical flanges, and said semi-circular inner flexible trimmer line guide section of said three flexible trimmer line guide sections being tangentially connected in unobstructed communication to said two external flexible trimmer line guide sections of said three flexible trimmer line guide sections and disposed within said central cavity closed face wherein said two external flexible trimmer line guide sections of said three flexible trimmer line guide sections having an open window disposed over a face of said one of said cylindrical flanges, and said semi-circular inner flexible trimmer line guide section of said three flexible trimmer line guide sections having an open window disposed within said central cavity closed face and being covered by said thrust face of said coupling means for maintaining the flexible trimmer line constrained within said semi-circular inner flexible trimmer line guide section.

18. The cutting head device of claim 14, wherein said spool means comprising a flexible trimmer line guide disposed within one of said cylindrical flanges, wherein said flexible trimmer line guide is comprised of three flexible trimmer line guide sections including two external flexible trimmer line guide sections and an arcuate inner flexible trimmer line guide section, diametrically crossing through said one of said cylindrical flanges and through said cylindrical hollow core, wherein said two external flexible trimmer line guide sections of said three flexible trimmer line guide sections, are collinear and diametrically opposed to each other and radially extending from said cylindrical hollow core to the periphery of said one of said cylindrical flanges, and said arcuate inner flexible trimmer line guide section of said three flexible trimmer line guide sections diametrically crossing through said cylindrical hollow core in alignment with said two external flexible trimmer line guide sections of said three flexible trimmer line guide sections and disposed within said central cavity closed face in unobstructed communication with said two external flexible trimmer line guide sections, wherein said central cavity closed face having a concave surface, said external flexible trimmer line guide sections of said three flexible trimmer line guide sections having an open window within a face of said one of said cylindrical flanges, and said inner flexible trimmer line guide section of said three flexible trimmer line guide sections having an open window disposed over said central cavity closed face which is closed by the contact of said thrust face of said coupling means, and wherein said spool three flexible trimmer line guide sections have a common arcuate channel to guide said flexible trimmer line through said spool means in a curved path perpendicular to a face of said cylindrical flanges.

19. The cutting head device of claim 14, wherein said ground bumping means cooperatively interengagable rotation control means are comprised of a plurality of circumferentially spaced flange tabs projecting radially outwardly from said ground bumping means cylindrical wall portion and a plurality of circumferentially spaced ground bumping means teeth projecting in a direction generally parallel and concentric to said cylindrical wall portion, and wherein said lower cover cooperatively interengagable rotation control means are comprised of a plurality of circumferentially spaced lower cover retention blocks projecting radially inwardly from said lower cover cylindrical side wall portion, separated from said radial wall portion by a gap, and a plurality of circumferentially spaced lower cover teeth projecting from said lower cover radial wall portion in a direction generally parallel and radially concentric to said lower cover cylindrical side wall portion.

20. The cutting head device of claim 14, wherein said lower cover cooperatively interengagable rotation control means in cooperation with said ground bumping means cooperatively interengagable rotation control means allow manual unidirectional rotation of said ground bumping means relative to said housing means by a biasing force of said spring means and wherein said unidirectional rotation being opposite to the rotation direction of the spool means during operation.

* * * * *